(12) United States Patent
Aoki

(10) Patent No.: US 8,656,791 B2
(45) Date of Patent: Feb. 25, 2014

(54) TORQUE DETECTION APPARATUS

(75) Inventor: Kenichiro Aoki, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/259,970

(22) PCT Filed: Aug. 25, 2010

(86) PCT No.: PCT/JP2010/064333
§ 371 (c)(1),
(2), (4) Date: Sep. 23, 2011

(87) PCT Pub. No.: WO2012/025999
PCT Pub. Date: Mar. 1, 2012

(65) Prior Publication Data
US 2013/0145865 A1    Jun. 13, 2013

(51) Int. Cl.
*G01L 3/00* (2006.01)

(52) U.S. Cl.
USPC .............................. 73/862.331; 73/862.333

(58) Field of Classification Search
USPC ..................................... 73/862.331–862.336
See application file for complete search history.

(56) References Cited

U.S. PATENT DOCUMENTS

| | | | | |
|---|---|---|---|---|
| 5,532,590 | A * | 7/1996 | Yamanaka | 324/239 |
| 6,912,921 | B2 * | 7/2005 | Fujiwara et al. | 73/862.328 |
| 7,938,026 | B2 * | 5/2011 | Oniwa et al. | 73/862.333 |
| 2003/0196496 | A1 * | 10/2003 | Goto et al. | 73/862.331 |

FOREIGN PATENT DOCUMENTS

| | | |
|---|---|---|
| JP | A-3-238317 | 10/1991 |
| JP | A-2002-22567 | 1/2002 |
| JP | A-2002-39795 | 2/2002 |
| JP | A-2003-315182 | 11/2003 |

OTHER PUBLICATIONS

International Search Report dated Nov. 2, 2010 in International Application No. PCT/JP2010/064333 (with translation).

* cited by examiner

*Primary Examiner* — Lisa Caputo
*Assistant Examiner* — Jonathan Dunlap
(74) *Attorney, Agent, or Firm* — Oliff PLC

(57) ABSTRACT

A first excitation AC signal ($V_1 = A_1 \cdot \sin(\omega t)$) is supplied to a first excitation coil of a first resolver via a first excitation line, and a second excitation AC signal ($V_2 = -A_2 \cdot \sin(\omega t)$) is supplied to a second excitation coil of a second resolver via a second excitation line. Within a resolver unit, a first excitation line and a second excitation line are connected via an electric resistance element. By virtue of this configuration, torque can be detected even when any of a ground line, a first excitation line, and a second excitation line of a wire harness is broken.

8 Claims, 13 Drawing Sheets

TORQUE DETECTION APPARATUS

The present invention relates to a torque detection apparatus which includes two resolvers and which detects torque acting on a shaft on the basis of rotational angles detected by the respective resolvers.

BACKGROUND ART

Conventionally, there has been known an electric power steering apparatus which produces a steering assist torque so as to assist a driver's steering operation. Such an electric power steering apparatus detects a steering torque acting on a steering shaft by use of a torque detection apparatus, computes a target assist torque which increases as the steering torque increases, and feedback-controls the amount of electricity supplied to an electric motor so as to obtain the calculated target assist torque. Accordingly, in such an electric power steering apparatus, in particular, the torque detection apparatus must be reliable.

A steering torque detection apparatus detects the torsion angle of a torsion bar provided in a steering shaft, and calculates a steering torque which is in proportion to the torsion angle. For example, a torque detection apparatus disclosed in Japanese Patent Application Laid-Open (kokai) No. 2003-315182 employs a configuration which detects the torsion angle of a torsion bar by making use of two resolvers. In this torque detection apparatus, a first resolver is provided at one end of the torsion bar, and a second resolver is provided at the other end thereof. Steering torque is detected from the difference between the rotational angle ($\theta_1$) detected by the first resolver and the rotational angle ($\theta_2$) detected by the second resolver.

Each resolver includes an excitation coil to which an excitation AC signal is supplied and which energizes a rotor coil, and a pair of detection coils fixedly disposed around the torsion bar. The pair of detection coils are assembled with a shift of 90 degrees ($\pi/2$) (electrical angle) provided therebetween. One detection coil outputs an AC signal having an amplitude corresponding to the sin value of the rotational angle of the rotor, and the other detection coil outputs an AC signal having an amplitude corresponding to the cos value of the rotational angle of the rotor.

The two resolvers are connected to an ECU, which constitutes a torque computation section. The ECU supplies an excitation AC signal to the excitation coil of the first resolver and the excitation coil of the second resolver via a common excitation line connected to one end of each excitation coil. Also, the ECU receives a sin value detection signal and a cos value detection signal from the respective detection coils of the first resolver via individual detection lines connected to one ends of the detection coils. Similarly, the ECU receives a sin value detection signal and a cos value detection signal from the respective detection coils of the second resolver via individual detection lines connected to one ends of the detection coils. Furthermore, the other ends of the excitation coil and the detection coils are connected to the ECU via a common ground line.

The ECU computes the rotational angles of the torsion bar at positions where the respective resolvers are provided from the outputs signals from the pair of detection coils of each resolver. The ECU then detects a steering torque acting on the torsion bar from the difference between the two rotational angles.

SUMMARY OF THE INVENTION

Problems to be Solved by the Invention

However, such a conventionally known torque detection apparatus has a problem. That is, when the excitation line is broken, the supply of the excitation AC signal to the two excitation coils is interrupted. Therefore, in each resolver, the pair of detection coils become unable to output detection signals, whereby detection of steering torque becomes impossible. As a result, an electric power steering apparatus becomes unable to continue steering assist control, whereby steering operation requires a larger operation force. Moreover, in the case where double wiring is employed so as to secure redundancy at the time of wire breakage, the structure becomes complex.

The present invention has been accomplished to solve the above-described problem, and its object is to improve reliability in terms of wire breakage, while minimizing an increase in the number of wiring lines which establish connection between an ECU (a torque computation section) and first and second resolvers.

Means for Solving the Problems

In order to achieve the above-described object, the present invention provides a torque detection apparatus comprising a resolver unit which includes a first resolver having a first excitation coil supplied with an excitation AC signal and adapted to output detection signals corresponding to a first rotational angle of a shaft at a first axial position thereof, and a second resolver having a second excitation coil supplied with an excitation AC signal and adapted to output detection signals corresponding to a second rotational angle of the shaft at a second axial position thereof; and a torque computation section connected to the resolver unit via a wire harness, the torque computation section supplying the excitation AC signals to the first excitation coil and the second excitation coil, receiving respective detection signals output from the first resolver and the second resolver, calculating the first rotational angle of the shaft at the first axial position and the second rotational angle of the shaft at the second axial position, and calculating a torque acting on the shaft around an axis thereof on the basis of the calculated first and second rotational angles. The torque detection apparatus is characterized in that the torque computation section supplies the corresponding excitation AC signal to the first excitation coil via a first excitation line, and supplies the corresponding excitation AC signal to the second excitation coil via a second excitation line different from the first excitation line; and the resolver unit includes an electric resistance element which electrically connects the first excitation line and the second excitation line together.

The torque detection apparatus of the present invention includes a resolver unit and a torque computation section. The resolver unit and the torque computation section are electrically connected with each other via a wire harness. The resolver unit includes a first resolver for detecting a rotational angle (first rotational angle) of a shaft at a first axial position thereof, and a second resolver for detecting a rotational angle (second rotational angle) of the shaft at a second axial position thereof. In the first resolver, an excitation AC signal output from the torque computation section is supplied to a first excitation coil thereof. This excitation AC signal is supplied to the first excitation coil via a first excitation line. Thus, the first resolver outputs detection signals whose amplitudes correspond to the first rotational angle, from detection coils for a plurality of phases. For example, the first resolver includes a sin phase detection coil and a cos phase detection coil. In this case, the first resolver outputs an AC voltage from the sin phase detection coil as a detection signal, the AC voltage having an amplitude which increases and decreases depending on the sin value of the first rotational angle, and outputs an AC voltage from the cos phase detection coil as a detection signal, the AC voltage having an amplitude which increases and decreases depending on the cos value of the first rotational angle.

Similarly, in the second resolver, an excitation AC signal output from the torque computation section is supplied to a second excitation coil thereof. This excitation AC signal is supplied to the second excitation coil via a second excitation line different from the first excitation line. Thus, the second resolver outputs detection signals whose amplitudes correspond to the second rotational angle, from detection coils for a plurality of phases. For example, the second resolver includes a sin phase detection coil and a cos phase detection coil. In this case, the second resolver outputs an AC voltage from the sin phase detection coil as a detection signal, the AC voltage having an amplitude which increases and decreases depending on the sin value of the second rotational angle, and outputs an AC voltage from the cos phase detection coil as a detection signal, the AC voltage having an amplitude which increases and decreases depending on the cos value of the second rotational angle.

As described above, the torque detection apparatus is configured such that excitation AC signals are supplied to the first excitation coil of the first resolver and the second excitation coil of the second resolver via the first excitation line and the second excitation line which are independently of each other. Furthermore, the first excitation line and the second excitation line are connected together within the resolver unit via the electric resistance element.

The torque computation section receives the detection signals output from the first resolver and the second resolver, calculates the first rotational angle and the second rotational angle on the basis of the received detection signals, and obtains, through calculation, torque acting on the shaft around an axis thereof on the basis of the calculated first and second rotational angles.

The resolver unit and the torque computation section are electrically connected with each other via a wire harness. In the case where the first excitation line contained in the wire harness is broken, the excitation AC signal is supplied to the resolver unit by use of the second excitation line only. The excitation AC signal is supplied to the second excitation coil from the second excitation line. The excitation AC signal is not supplied to the first excitation coil from the first excitation line. However, since the first excitation line and the second excitation line connected together within the resolver unit via the electric resistance element, the excitation AC signal is supplied from the second excitation line to the first excitation coil via the electric resistance element. In this case, the current flowing through the first excitation coil changes from that in an ordinary state (a state in which no wire breakage is present). As a result, the voltages of the detection signals output from the first resolver also change. However, since the voltage valance between the detection signals of the two phases does not change, the breakage of the first excitation line does not affect the calculation of the first rotational angle. Accordingly, even when the first excitation line is broken, the first rotational angle can be calculated.

Similarly, in the case where the second excitation line contained in the wire harness is broken, the excitation AC signal is supplied to the resolver unit by use of the first excitation line only. The excitation AC signal is supplied to the first excitation coil from the first excitation line. The excitation AC signal is supplied from the first excitation line to the second excitation coil via the electric resistance element. In this case, the current flowing through the second excitation coil changes from that in an ordinary state (a state in which no wire breakage is present), and the voltages of the detection signals output from the second resolver also change. However, the voltage valance between the detection signals of the two phases does not change. Accordingly, even when the second excitation line is broken, the second rotational angle can be calculated.

As described above, according to the present invention, through individual provision of an excitation line for each resolver and through provision of an electric resistance element between the two excitation lines, reliability in terms of wire breakage can be improved at low cost, without great increase in the complexity of the configuration.

Another feature of the present invention resides in that the first excitation coil is connected to the torque computation section via the first excitation line connected to one end of the first excitation coil and a common ground line connected to the other end of the first excitation coil; the second excitation coil is connected to the torque computation section via the second excitation line connected to one end of the second excitation coil and the common ground line connected to the other end of the second excitation coil; and the torque computation section includes a reverse phase coil drive circuit which outputs to the first excitation line and the second excitation line individual excitation AC signals which have the same frequency and which are opposite in phase.

In the present invention, the reverse phase coil drive circuit outputs individual excitation AC signals to the first excitation line and the second excitation line. As a result, in the first resolver, an AC voltage for excitation is applied between the first excitation line and the common ground line, whereby an AC current flows through the first excitation coil. Also, in the second resolver, an AC voltage for excitation is applied between the second excitation line and the common ground line, whereby an AC current flows through the second excitation coil. This common ground line may be grounded so that the common ground line assumes the same potential as the ground of a power supply apparatus. However, the common ground line is not necessarily required to be constructed in that manner. The potential of the common ground line can be free set so long as the potential corresponds to the center of the amplitude of the excitation AC signal such that an AC voltage for excitation is generated between the excitation line and the common ground line.

The excitation AC signal output from the reverse coil drive circuit to the first excitation line and the excitation AC signal output from the reverse coil drive circuit to the second excitation line are set such that they have the same frequency, and are opposite in phase.

In such a configuration, even when the common ground line is broken, the potential of the common ground line within the resolver unit does not change. Accordingly, the first excitation coil and the second excitation coil can be driven in the same manner as in an ordinary state (a state in which the common ground line is not broken). Thus, according to the present invention, even when the common ground line is broken, the first rotational angle and the second rotational angle can be calculated properly, and torque can be detected from these rotational angles. Notably, the reverse coil drive circuit is not necessarily required to render the excitation AC signal output to the first excitation line and the excitation AC signal output to the second excitation line opposite in phase all the time. The reverse coil drive circuit may be configured to render these excitation AC signals opposite in phase only when the common ground line is broken.

Another feature of the present invention resides in that the torque detection apparatus comprises first-excitation-line breakage detection means for detecting breakage of the first excitation line on the basis of the detection signals output from the first resolver; second-excitation-line breakage detection means for detecting breakage of the second excitation line on the basis of the detection signals output from the second resolver; and rotational angle correction means for inverting the sign of the calculated first rotational angle when breakage of the first excitation line is detected, and inverting the sign of the calculated second rotational angle when breakage of the second excitation line is detected.

In the present invention, in the case where the first excitation line is broken, the excitation AC signal is supplied from the second excitation line to the first excitation coil via the electric resistance element. Therefore, the current flowing through the first excitation coil changes as compared with the ordinary state. As a result, the voltages of the detection signals output from the first resolver also change as compared with the ordinary state. By making use of such a phenomenon, the first excitation line breakage detection means detects breakage of the first excitation line on the basis of the voltages of the detection signals output from the first resolver. Similarly, in the case where the second excitation line is broken, the voltages of the detection signals output from the second resolver also change as compared with the ordinary state. By making use of such a phenomenon, the second excitation line breakage detection means detects breakage of the second excitation line on the basis of the voltages of the detection signals output from the second resolver.

In the case where the first excitation line is broken, the excitation AC signal supplied to the first excitation coil becomes opposite in phase to the excitation AC signal supplied in the ordinary state. Therefore, the rotational angle correction means inverts the sign (positive/negative) of the first rotational angle when breakage of the first excitation line is detected, and inverts the sign of the second rotational angle when breakage of the second excitation line is detected. By virtue of this, even when the excitation line is broken, the rotational angle can be calculated properly.

Another feature of the present invention resides in that the torque detection apparatus further comprises phase delay correction means for correcting phase delays of the detection signals output from the first resolver when breakage of the first excitation line is detected, and correcting phase delays of the detection signals output from the second resolver when breakage of the second excitation line is detected.

In the present invention, in the case where the first excitation line is broken, the excitation AC signal is supplied from the second excitation line to the first excitation coil via the electric resistance element. Therefore, the phase delays of the detection signals output from the first resolver change. Also, in the case where the second excitation line is broken, the excitation AC signal is supplied from the first excitation line to the second excitation coil via the electric resistance element. Therefore, the phase delays of the detection signals output from the second resolver change. In order to overcome this drawback, in the present invention, the phase delay correction means corrects the phase delays of the detection signals output from the first resolver when breakage of the first excitation line is detected, and corrects the phase delays of the detection signals output from the second resolver when breakage of the second excitation line is detected. By virtue of this, the calculation of the rotational angle at the time when the excitation line is broken can be performed more accurately.

Another feature of the present invention resides in that an inductor is connected in series to the electric resistance element such that, even when the first excitation line or the second excitation line is broken, the phase delays of the detection signals output from the first resolver or the phase delays of the detection signals output from the second resolver do not change.

In the present invention, an electric resistance element and an inductor are connected in series between the first excitation line and the second excitation line. Accordingly, when the first excitation line or the second excitation line is broken, the excitation AC signal is supplied to the first excitation coil or the second excitation coil via the electric resistance element and the inductor. Therefore, by means of adjusting the inductance of the inductor in advance, it becomes possible to prevent the phase delays of the detection signals output from the resolver from changing even when one excitation line is broke. By virtue of this, the calculation of the rotational angle at the time when the excitation line is broken can be performed more accurately.

Another feature of the present invention resides in that the torque detection apparatus further comprises excitation line breakage report means for reporting an anomaly when breakage of the first excitation line or breakage of the second excitation line is detected.

In the present invention, as described above, torque can be detected even when the first excitation line or the second excitation line is broken. However, if the torque detection apparatus is continuously used in such a state, the excitation line or the common ground line, which was normal, may also be broken; that is, a double failure may occur. In such a case, detection of torque becomes impossible. In order to overcome such a drawback, in the present invention, the excitation line breakage report means reports an anomaly when breakage of the first excitation line or breakage of the second excitation line is detected. By virtue of this, it becomes possible to prompt a user to perform repair. Accordingly, occurrence of a double failure can be restrained, whereby reliability is improved.

Another feature of the present invention resides in that the torque detection apparatus further comprises ground line breakage detection means for rendering a potential of one of the first excitation line and the second excitation line equal to a set potential of the common ground line, and detecting breakage of the common ground line on the basis of the detection signals of the one of the first resolver and the second resolver in that state; and ground line breakage report means for reporting an anomaly when breakage of the common ground line is detected.

In the present invention, as described above, the first excitation coil and the second excitation coil are driven by the excitation AC signal output from the reverse phase coil drive circuit. Therefore, even when the common ground line is broken, the first excitation coil and the second excitation coil can be driven in the same manner as in the ordinary state (the state in which the common ground line is not broken). However, if the torque detection apparatus is continuously used in such a state, the excitation line, which was normal, may also be broken; that is, a double failure may occur. In such a case, detection of torque becomes impossible. In order to overcome such a drawback, in the present invention, the torque detection apparatus further comprises ground line breakage detection means for detecting breakage of the common ground line, and ground line breakage report means for reporting an anomaly when breakage of the common ground line is detected.

In order to detect breakage of the common ground line, the ground line breakage detection means sets the potential of one of the first excitation line and the second excitation line to a potential equal to the set potential of the common ground line. For example, in the case where the common ground line is grounded, the potential of the one of the first excitation line and the second excitation line is fixed to zero volt. In this case, if the common ground line is not broken, the potential difference between the common ground line and the first excitation line or between the common ground line and the second excitation line becomes zero volt. Therefore, no current flows into the first excitation coil or the second excitation coil. Accordingly, the first resolver or the second resolver does not output the detection signals. Meanwhile, if the common ground line is broken, the AC voltage for excitation is applied between the first excitation line and the second excitation line, whereby current flows into both the first excitation coil and the second excitation coil. Accordingly, when the common ground line is broken, detection signals are output from a resolver which should not output the detection signals.

By making use of such a phenomenon, the ground line breakage detection means renders the potential of one of the first excitation line and the second excitation line equal to the set potential of the common ground line, and detects breakage of the common ground line on the basis of the detection signals of the first resolver or the second resolver in that state. When breakage of the common ground line is detected, the ground line breakage report means reports an anomaly. By virtue of this, it becomes possible to prompt a user to perform repair. Accordingly, occurrence of a double failure can be restrained, whereby reliability is improved.

Another feature of the present invention resides in that the torque detection apparatus further comprises resistor breakage detection means for causing the torque computation section to open one of the first excitation line and the second excitation line, and detecting breakage of the electric resistance element on the basis of the first rotational angle or the second rotational angle calculated in that state; and resistor breakage report means for reporting an anomaly when breakage of the electric resistance element is detected.

In the present invention, even when the electric resistance element is broken, it is possible to calculate the first rotational angle and the second rotational angle, to thereby detect torque. However, if use of the torque detection apparatus is continued in such a state, detection of torque becomes impossible when the first excitation line or the second excitation line is broken. In order to overcome such a drawback, the torque detection apparatus of the present invention comprises resistor breakage detection means for detecting breakage of the electric resistance element, and resistor breakage report means for reporting an anomaly when breakage of the electric resistance element is detected.

In order to detect breakage of the electric resistance element, the resistor breakage detection means causes the torque computation section to open one of the first excitation line and the second excitation line. That is, the resistor breakage detection means creates a state which is the same as the state in which the first excitation line or the second excitation line is broken. In this case, if the electric resistance element is not broken, the first rotational angle or the second rotational angle can be calculated properly. Meanwhile, if the electric resistance element is broken, the first rotational angle or the second rotational angle cannot be calculated properly, because the first excitation line or the second excitation line cannot be energized properly.

In the present invention, the resistor breakage detection means detects breakage of the electric resistance element on the basis of the first rotational angle or the second rotational angle calculated in a state in which one of the first excitation line and the second excitation line is brought into an open state by the torque computation section. For example, the resistor breakage detection means compares a rotational angle detected in a state in which the one of the first excitation line and the second excitation line is not brought into an open state and a rotational angle detected in a state in which the one of the first excitation line and the second excitation line is brought into an open state. When the difference between these rotational angles is equal to or greater than a predetermined value, the resistor breakage detection means determines that the electric resistance element is broken. When breakage of the electric resistance element is detected, the resistor breakage report means reports an anomaly. By virtue of this, it becomes possible to prompt a user to perform repair. Accordingly, occurrence of a double failure can be restrained, whereby reliability is improved.

MODE FOR CARRYING OUT THE INVENTION

Figure 1:
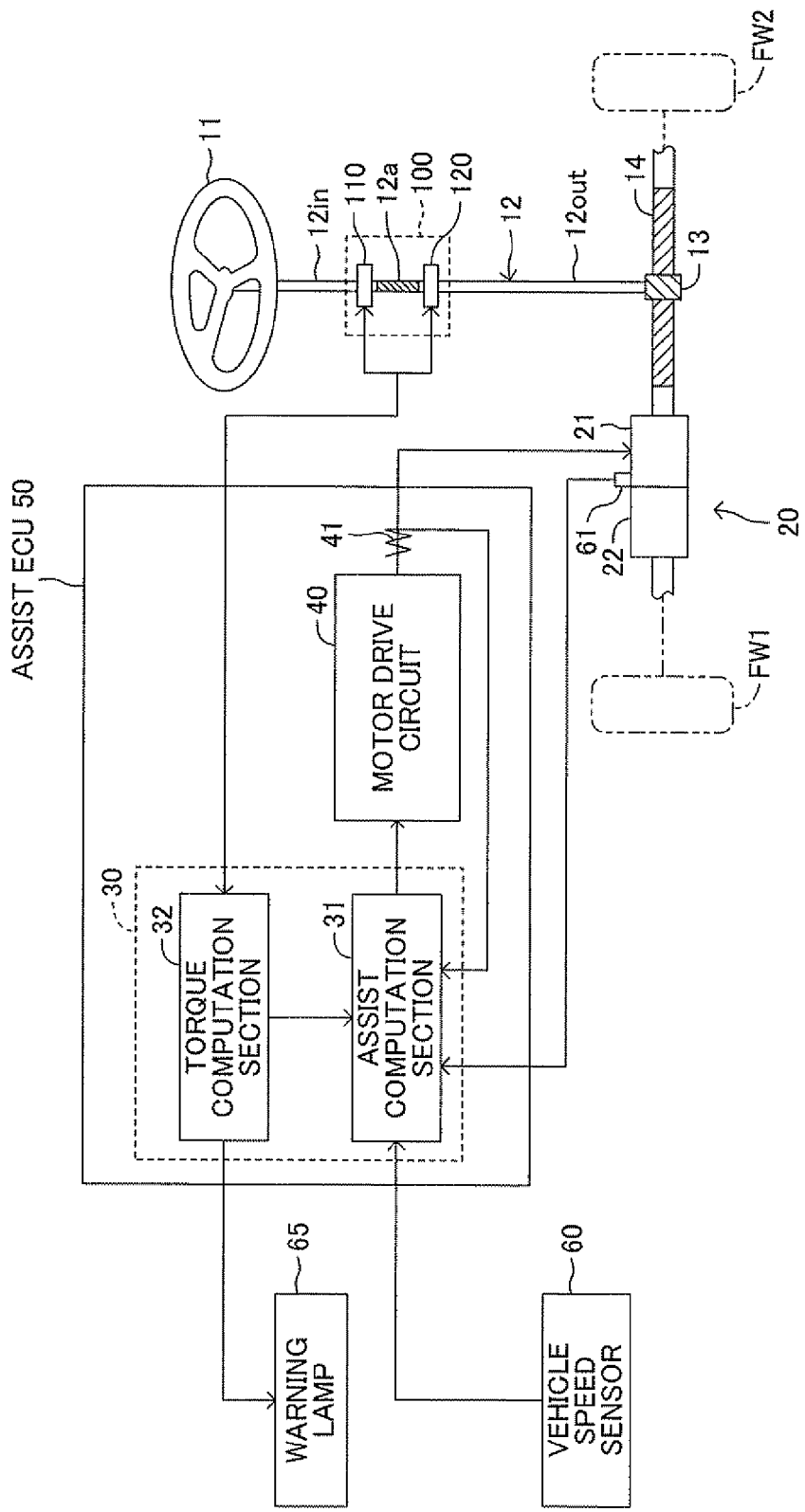
FIG. 1 is a schematic configurational diagram of an electric power steering apparatus equipped with a torque detection apparatus according to an embodiment.

One embodiment of the present invention will next be described with reference to the drawings. FIG. 1 is a schematic configurational diagram of an electric power steering apparatus equipped with a torque detection apparatus according to an embodiment.

The electric power steering apparatus for a vehicle includes a steering mechanism 10 for steering left and right front wheels FW1, FW2 (steerable wheels) in accordance with a driver's steering operation applied to a steering wheel 11; a power assist section 20 provided in the steering mechanism 10 and adapted to generate steering assist torque; an assist control apparatus 50 (hereinafter referred to as the assist ECU 50) for driving and controlling an electric motor 21 of the power assist section 20; a vehicle speed sensor 60; and a resolver unit 100.

The steering mechanism 10 includes a steering shaft 12 whose upper end is connected to the steering wheel 11 for unitary rotation therewith. A pinion gear 13 is connected to the lower end of the steering shaft 12 for unitary rotation therewith. The pinion gear 13 engages with a rack gear formed on a rack bar 14 to thereby constitute a rack and pinion mechanism. The left and right front wheels FW1, FW2 are steerably connected to opposite ends of the rack bar 14 via unillustrated tie rods and knuckle arms. The left and right front wheels FW1, FW2 are steered leftward and rightward in accordance with an axial displacement of the rack bar 14 caused by rotation of the steering shaft 12 about the axis thereof.

A power assist section 20 is assembled to the rack bar 14. The power assist section 20 is composed of the electric motor 21 (e.g., a three-phase DC brushless motor) for steering assist, and a ball screw mechanism 22. The rotation shaft of the electric motor 21 is connected to the rack bar 14 via the ball screw mechanism 22 so as to transmit power to the rack bar 14. The electric motor 21 assists the steering of the left and right front wheels FW1, FW2 by rotating its rotation shaft. The ball screw mechanism 22, which functions as a speed reducer and a rotation-linear motion converter, reduces the rotational speed of the rotation shaft of the electric motor 21, converts the rotation of the rotation shaft to rectilinear motion, and transmits the rectilinear motion to the rack bar 14.

A rotational angle sensor 61 is provided on the electric motor 21 so as to detect the rotational angle of the rotation shaft thereof. The rotational angle sensor 61 is connected to the assist ECU 50.

The steering shaft 12 includes a torsion bar 12a provided at an intermediate position with respect to the axial direction thereof. A portion of the steering shaft 12 which connects the upper end of the torsion bar 12a and the steering wheel 11 will be referred to as an input shaft 12in, and a portion of the steering shaft 12 which connects the lower end of the torsion bar 12a and the pinion gear 13 will be referred to as an output shaft 12out.

The resolver unit 100 is provided on the steering shaft 12. The resolver unit 100 is composed of the torsion bar 12a, a first resolver 110 assembled to the input shaft 12in, and a second resolver 120 assembled to the output shaft 12out. The first resolver 110 outputs a signal corresponding to the rotational angle of the input shaft 12in (the rotational angle at one end of the torsion bar 12a corresponding to the rotational angle at the first axial position of the present invention). The second resolver 120 outputs a signal corresponding to the rotational angle of the output shaft 12out (the rotational angle at the other end of the torsion bar 12a corresponding to the rotational angle at the second axial position of the present invention). When the steering wheel 11 is rotated, a torque acts on the steering shaft 12, whereby the torsion bar 12a is twisted. The torsion angle of the torsion bar 12a is proportional to the steering torque acting on the steering shaft 12. Accordingly, the steering torque acting on the steering shaft 12 can be detected by means of obtaining the difference between the rotational angle $\theta_1$ detected by the first resolver 110 and the rotational angle $\theta_2$ detected by the second resolver 120. The first resolver 110 and the second resolver 120 are connected to the assist ECU 50.

The assist ECU 50 includes a computation section 30 composed of a microcomputer, a signal processing circuit, etc.; and a motor drive circuit 40 (e.g., a three-phase inverter circuit) composed of a switching circuit. The computation section 30 is composed of an assist computation section 31 and a torque computation section 32. The torque computation section 32 is connected to the resolver unit 100, and detects, through computation, the steering torque acting on the steering shaft 12. The portion composed of the resolver unit 100 and the torque computation section 32 corresponds to the torque detection apparatus of the present invention. The resolver unit 100 and the torque computation section 32 will be described later.

The motor drive circuit 40 receives a PWM control signal from the assist computation section 31, and controls the duty ratios of internal switching elements, to thereby adjust the amount of electricity supplied to the electric motor 21. A current sensor 41 for detecting current flowing through the electric motor 21 is provided for the motor drive circuit 40.

The current sensor 41, the vehicle speed sensor 60, and the rotational angle sensor 61 are connected to the assist computation section 31. The vehicle speed sensor 60 outputs a vehicle speed detection signal representing vehicle speed vx. The assist computation section 31 also receives the steering torque calculated by the torque computation section 32. A warning lamp 65 for reporting anomaly to a driver is connected to the assist computation section 31, and the assist computation section 31 turns on the warning lamp 65 at the time of detection of wire breakage to be described later.

Next, steering assist control performed by the assist computation section 31 will be described briefly. The assist computation section 31 acquires the vehicle speed vx detected by the vehicle speed sensor 60 and the steering torque Tr calculated by the torque computation section 32, and calculates a target assist torque on the basis of the acquired vehicle speed vx and steering torque Tr. The target assist torque is set with reference to an unillustrated assist map or the like such that the target assist torque increases as the steering torque Tr increases, and decreases as the vehicle speed vx increases. The assist computation section 31 calculates a target current required to generate the target assist torque, calculates a target instruction voltage on the basis of the difference between the actual current detected by the current sensor 41 and the target current, by making use of a PI control (proportional-plus-integral control) equation or the like, and outputs to the motor drive circuit 40 a PWM control signal corresponding to the target instruction voltage. The assist computation section 31 acquires the rotational angle (electrical angle) of the electric motor 21 detected by the rotational angle sensor 61, and generates a PWM control signal of three phases (U phase, V phase, and W phase) corresponding to the rotational angle, to thereby apply a three-phase drive voltage to the electric motor 21. Thus, through current feedback control, the target current flows through the electric motor 21 such that the electric motor 21 rotates in the same direction as the direction of the driver's steering operation. As a result, the driver's steering operation is properly assisted by the torque generated by the electric motor 21.

In order to properly perform such steering assist control, highly reliable detection of the steering torque Tr is necessary. In view of this, in the present embodiment, the steering torque Tr is detected by the following configuration.

Figure 2:
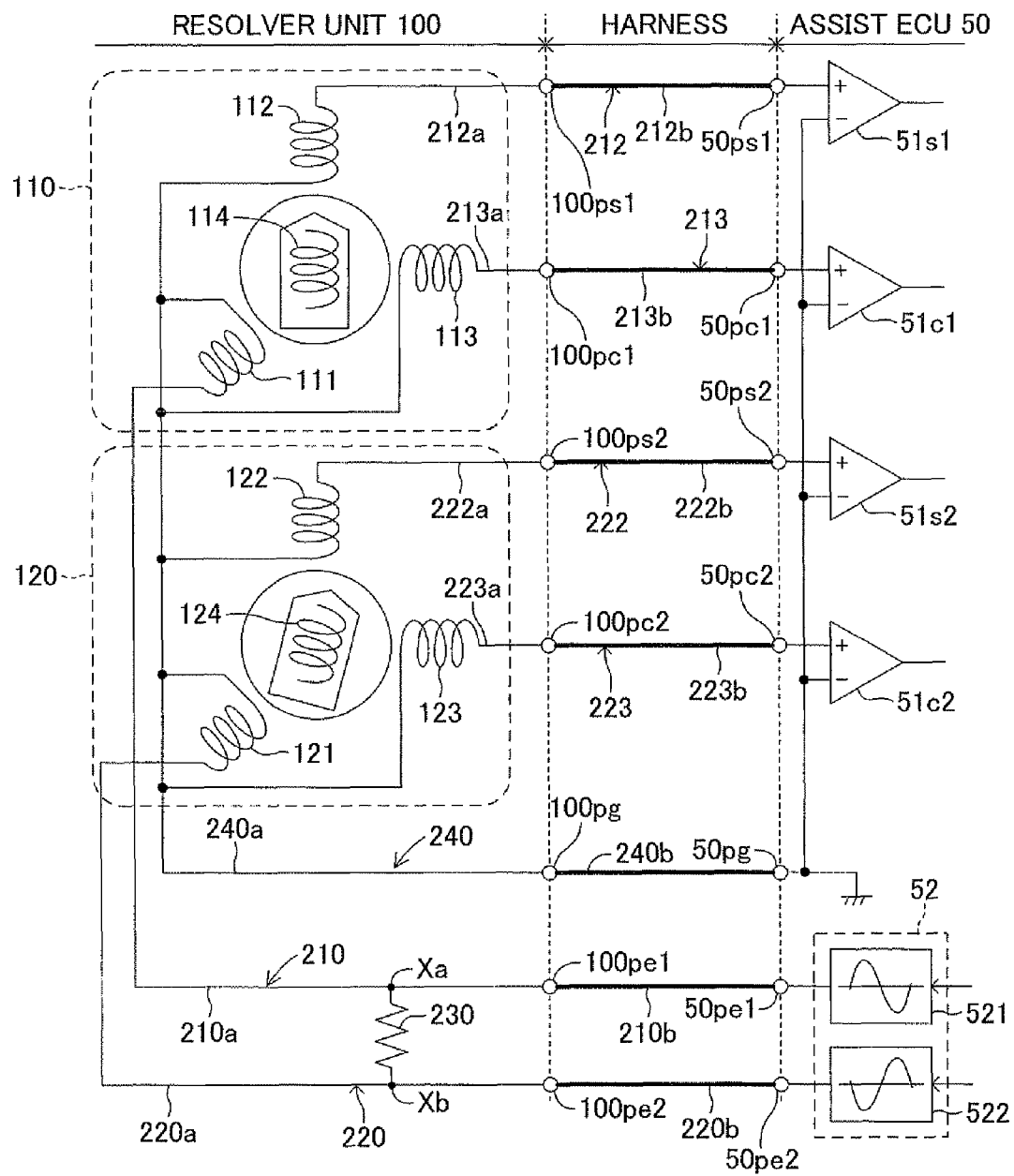
FIG. 2 is an electrical circuit diagram showing the structure of a resolver unit, and the connection between the resolver unit and an assist ECU.

First, the resolver unit 100 will be described. FIG. 2 schematically shows the circuit configuration of the resolver unit 100. The first resolver 110 includes the input shaft 12in as a rotor. A first excitation coil 111 wound along the circumferential direction of the rotor is fixedly provided on a stator located radially outward of the input shaft 12in. A first rotor coil 114 is fixedly provided on the input shaft 12in, which serves as the rotor. The first rotor coil 114 rotates as a result of rotation of the rotor. The first rotor coil 114 is electrically connected, in a non-contact fashion, with the first excitation coil 111 via a transformer (not shown) provided in the rotor, whereby the first rotor coil 114 is energized by an AC voltage applied to the first excitation coil 111. Notably, although not illustrated, in order to increase the resolution of rotational angle, a plurality of first rotor coils 114 are disposed at equal angular intervals such that the electrical angle becomes k times the mechanical rotational angle of the rotor.

The first resolver 110 includes a first sin phase detection coil 112 and a first cos phase detection coil 113 provided on the stator located radially outward of the input shaft 12in. The first sin phase detection coil 112 and the first cos phase detection coil 113 are disposed such that they shift from each other by π/2 in electrical angle.

The first sin phase detection coil 112 and the first cos phase detection coil 113 are disposed on the rotation plane of the first rotor coil 114, and output AC voltage signals upon receipt of magnetic flux generated by the first rotor coil 114. The amplitudes of the AC voltage signals generated by the first sin phase detection coil 112 and the first cos phase detection coil 113 change in accordance with the respective rotational positions of the first sin phase detection coil 112 and the first cos phase detection coil 113 in relation to the first rotor coil 114. That is, the first sin phase detection coil 112 outputs an AC voltage signal having an amplitude corresponding to the sin value of the rotational angle of the input shaft 12in; and the first cos phase detection coil 113 outputs an AC voltage signal having an amplitude corresponding to the cos value of the rotational angle of the input shaft 12in.

One end of the first excitation coil 111 is connected to a first excitation signal output port 50pe1 of the assist ECU 50 via a first excitation line 210. Notably, in the case where a portion of the first excitation line 210 provided within the resolver unit 100 and a harness portion thereof provided between the resolver unit 100 and the assist ECU 50 are distinguishably described, the portion provided within the resolver unit 100 will be referred to as an internal first excitation line 210a, and the harness portion provided between the resolver unit 100 and the assist ECU 50 will be referred to as an external first excitation line 210b. The internal first excitation line 210a and the external first excitation line 210b are connected at a first excitation signal input port 100pe1.

One end of the first sin phase detection coil 112 is connected to a first sin phase signal input port 50ps1 of the assist ECU 50 via a first sin phase detection line 212. Also, one end of the first cos phase detection coil 113 is connected to a first cos phase signal input port 50pc1 of the assist ECU 50 via a first cos phase detection line 213. Notably, in the case where a portion of the first sin phase detection line 212 provided within the resolver unit 100 and a harness portion thereof provided between the resolver unit 100 and the assist ECU 50 are distinguishably described, the portion provided within the resolver unit 100 will be referred to as an internal first sin phase detection line 212a, and the harness portion provided between the resolver unit 100 and the assist ECU 50 will be referred to as an external first sin phase detection line 212b. Similarly, in the case where a portion of the first cos phase detection line 213 provided within the resolver unit 100 and a harness portion thereof provided between the resolver unit 100 and the assist ECU 50 are distinguishably described, the portion provided within the resolver unit 100 will be referred to as an internal first cos phase detection line 213a, and the harness portion provided between the resolver unit 100 and the assist ECU 50 will be referred to as an external first cos phase detection line 213b. The internal first sin phase detection line 212a and the external first sin phase detection line 212b are connected at a first sin phase signal output port 100ps1. Also, the internal first cos phase detection line 213a and the external first cos phase detection line 213b are connected at a first cos phase signal output port 100pc1.

The second resolver 120 includes the output shaft 12out as a rotor. A second excitation coil 121 wound along the circumferential direction of the rotor is fixedly provided on a stator located radially outward of the output shaft 12out. A second rotor coil 124 is fixedly provided on the output shaft 12out, which serves as the rotor. The second rotor coil 124 rotates as a result of rotation of the rotor. The second rotor coil 124 is electrically connected, in a non-contact fashion, with the second excitation coil 121 via a transformer (not shown) provided in the rotor, whereby the second rotor coil 124 is energized by an AC voltage applied to the second excitation coil 121. Notably, although not illustrated, in order to increase the resolution of rotational angle, a plurality of second rotor coils 124 are disposed at equal angular intervals such that the electrical angle becomes k times the mechanical rotational angle of the rotor.

The second resolver 120 includes a second sin phase detection coil 122 and a second cos phase detection coil 123 provided on the stator located radially outward of the output shaft 12out. The second sin phase detection coil 122 and the second cos phase detection coil 123 are disposed such that they shift from each other by π/2 in electrical angle.

The second sin phase detection coil 122 and the second cos phase detection coil 123 are disposed on the rotation plane of the second rotor coil 124, and output AC voltage signals upon receipt of magnetic flux generated by the second rotor coil 124. The amplitudes of the AC voltage signals generated by the second sin phase detection coil 122 and the second cos phase detection coil 123 change in accordance with the respective rotational positions of the second sin phase detection coil 122 and the second cos phase detection coil 123 in relation to the second rotor coil 124. That is, the second sin phase detection coil 122 outputs an AC voltage signal having an amplitude corresponding to the sin value of the rotational angle of the output shaft 12out; and the second cos phase detection coil 123 outputs an AC voltage signal having an amplitude corresponding to the cos value of the rotational angle of the output shaft 12out.

One end of the second excitation coil 121 is connected to a second excitation signal output port 50pe2 of the assist ECU 50 via a second excitation line 220. Notably, in the case where a portion of the second excitation line 220 provided within the resolver unit 100 and a harness portion thereof provided between the resolver unit 100 and the assist ECU 50 are distinguishably described, the portion provided within the resolver unit 100 will be referred to as an internal second excitation line 220a, and the harness portion provided between the resolver unit 100 and the assist ECU 50 will be referred to as an external second excitation line 220b. The internal second excitation line 220a and the external second excitation line 220b are connected at a second excitation signal input port 100pe2.

One end of the second sin phase detection coil 122 is connected to a second sin phase signal input port 50ps2 of the assist ECU 50 via a second sin phase detection line 222. Also, one end of the second cos phase detection coil 123 is connected to a second cos phase signal input port 50pc2 of the assist ECU 50 via a second cos phase detection line 223.

Notably, in the case where a portion of the second sin phase detection line 222 provided within the resolver unit 100 and a harness portion thereof provided between the resolver unit 100 and the assist ECU 50 are distinguishably described, the portion provided within the resolver unit 100 will be referred to as an internal second sin phase detection line 222a, and the harness portion provided between the resolver unit 100 and the assist ECU 50 will be referred to as an external second sin phase detection line 222b. Similarly, in the case where a portion of the second cos phase detection line 223 provided within the resolver unit 100 and a harness portion thereof provided between the resolver unit 100 and the assist ECU 50 are distinguishably described, the portion provided within the resolver unit 100 will be referred to as an internal second cos phase detection line 223a, and the harness portion provided between the resolver unit 100 and the assist ECU 50 will be referred to as an external second cos phase detection line 223b. The internal second sin phase detection line 222a and the external second sin phase detection line 222b are connected at a second sin phase signal output port 100ps2. Also, the internal second cos phase detection line 223a and the external second cos phase detection line 223b are connected at a second cos phase signal output port 100pc2.

Furthermore, the internal first excitation line 210a and the internal second excitation line 220a are electrically connected via an electric resistance element 230. That is, one end (the excitation signal input side) of the first excitation coil 111 and one end (the excitation signal input side) of the second excitation coil 121 are electrically connected via the electric resistance element 230 within the casing of the resolver unit 100. Hereinafter, the connection point between the internal first excitation line 210a and the electric resistance element 230 will be referred to as a connection point Xa, and the connection point between the internal second excitation line 220a and the electric resistance element 230 will be referred to as a connection point Xb.

Moreover, the other end of the first excitation coil 111, the other end of the second excitation coil 121, the other end of the first sin phase detection coil 112, the other end of the first cos phase detection coil 113, the other end of the second sin phase detection coil 122, and the other end of the second cos phase detection coil 123 are connected to a ground port 50pg of the assist ECU 50 via a common ground line 240. Notably, in the case where a portion of the ground line 240 provided within the resolver unit 100 and a harness portion thereof provided between the resolver unit 100 and the assist ECU 50 are distinguishably described, the portion provided within the resolver unit 100 will be referred to as an internal ground line 240a, and the harness portion provided between the resolver unit 100 and the assist ECU 50 will be referred to as an external ground line 240b. The internal ground line 240a and the external ground line 240b are connected at a ground port 100pg.

The external first excitation line 210b, the external first sin phase detection line 212b, the external first cos phase detection line 213b, the external second excitation line 220b, the external second sin phase detection line 222b, the external second cos phase detection line 223b, and the external ground line 240b, which are laid between the resolver unit 100 and the assist ECU 50, are bundled to form a wire harness.

Figure 3:
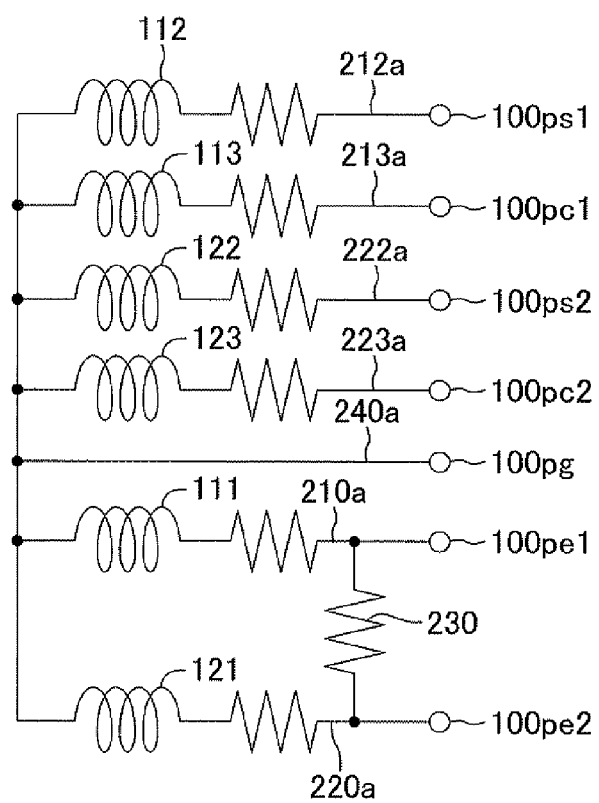
FIG. 3 is an equivalent circuit diagram of the resolver unit.

Notably, the resolver unit 100 shown in FIG. 2 can be represented by an equivalent circuit shown in FIG. 3.

The assist ECU 50 includes a coil drive circuit 52. This coil drive circuit 52 includes a first excitation coil drive circuit 521 and a second excitation coil drive circuit 522. The first excitation coil drive circuit 521 outputs from a first excitation signal output port 50pe1 an AC voltage for excitation which has a constant period and a constant amplitude. Hereinafter, the AC voltage for excitation output from the first excitation signal output port 50pe1 will be referred to as a first excitation signal, and the voltage of the first excitation signal will be referred to as a first excitation voltage $V_1$. The first excitation voltage $V_1$ is represented by the following equation, in which $A_1$ represents the amplitude.

$$V_1 = A_1 \cdot \sin(\omega t)$$

The second excitation coil drive circuit 522 outputs from a second excitation signal output port 50pe2 an AC voltage for excitation which has the same frequency as that of the AC voltage for excitation output from the first excitation coil drive circuit 521. The AC voltages output from the second excitation coil drive circuit 522 and output from the first excitation coil drive circuit 521 are opposite each other in phase (have a phase difference of n therebetween). Hereinafter, the AC voltage for excitation output from the second excitation signal output port 50pe2 will be referred to as a second excitation signal, and the voltage of the second excitation signal will be referred to as a second excitation voltage $V_2$. The second excitation voltage $V_2$ is represented by the following equation, in which $A_2$ represents the amplitude.

$$V_2 = -A_2 \cdot \sin(\omega t)$$

Notably, the amplitudes $A_1$, $A_2$ of the first excitation voltage $V_1$ and the second excitation voltage $V_2$ are set in accordance with the characteristics of the first resolver 110 and the second resolver 120. In the present embodiment, the amplitude $A_1$ and the amplitude $A_2$ are set to the same value ($A_1 = A_2$) so that the potential of the internal ground line 240a is maintained at a constant level (in the present embodiment, zero volt) even when the external ground line 240b breaks.

For example, the two excitation signals are generated as follows. The assist ECU 50 stores a sinusoidal wave signal in a digital form, outputs this sinusoidal wave signal to the first excitation coil drive circuit 521, and outputs to the second excitation coil drive circuit 522 a signal obtained by inverting the sinusoidal wave signal. Each of the drive circuits 521, 522 includes a D/A converter (not shown) for converting an input digital signal to an analog signal, and an amplifier (not shown) for amplifying the output signal of the D/A converter; and outputs an excitation signal represented by the above-mentioned equation from the amplifier. Notably, the excitation signal can be generated by other various methods. For example, a first pulse train signal is supplied to the first excitation coil drive circuit 521, and a second pulse train signal obtained by inverting the first pulse train signal is supplied to the second excitation coil drive circuit 522. In the drive circuits 521, 522, waveform shaping processing is performed for the respective pulse train signals so as to output two sinusoidal voltages which are opposite each other in phase.

Notably, the first excitation coil drive circuit 521 and the second excitation coil drive circuit 522 are individually controlled in accordance with instructions from the microcomputer within the assist ECU 50. Accordingly, the assist ECU 50 can output the first excitation signal and the second excitation signal independently of each other.

The first excitation signal is supplied to the first excitation coil 111 of the first resolver 110 via the first excitation line 210. Similarly, the second excitation signal is supplied to the second excitation coil 121 of the second resolver 120 via the second excitation line 220.

When the first excitation coil 111 of the first resolver 110 is excited by the first excitation signal, an AC voltage is generated in each of the first sin phase detection coil 112 and the first cos phase detection coil 113. Similarly, when the second excitation coil 121 of the second resolver 120 is excited by the second excitation signal, an AC voltage is generated in each of the second sin phase detection coil 122 and the second cos phase detection coil 123.

The AC voltage signal output from the first sin phase detection coil 112 will be referred to as a first sin phase detection signal, and its voltage will be referred to as a first sin phase detection voltage Es1. Similarly, the AC voltage signal output from the first cos phase detection coil 113 will be referred to as a first cos phase detection signal, and its voltage will be referred to as a first cos phase detection voltage Ec1. The first sin phase detection voltage Es1 and the first cos phase detection voltage Ec1 are represented by the following equations.

$$Es1 = \alpha \cdot A_1 \cdot \sin(k \cdot \theta_1) \cdot \sin(\omega t + \phi)$$

$$Ec1 = \alpha \cdot A_1 \cdot \cos(k \cdot \theta_1) \cdot \sin(\omega t + \phi)$$

Also, the AC voltage signal output from the second sin phase detection coil 122 will be referred to as a second sin phase detection signal, and its voltage will be referred to as a second sin phase detection voltage Es2. Similarly, the AC voltage signal output from the second cos phase detection coil 123 will be referred to as a second cos phase detection signal, and its voltage will be referred to as a second cos phase detection voltage Ec2. The second sin phase detection voltage Es2 and the second cos phase detection voltage Ec2 are represented by the following equations.

$$Es2 = -\alpha \cdot A_2 \cdot \sin(k \cdot \theta_2) \cdot \sin(\omega t + \phi)$$

$$Ec2 = -\alpha \cdot A_2 \cdot \cos(k \cdot \theta_2) \cdot \sin(\omega t + \phi)$$

In the above mentioned equations, $\theta_1$ represents the angle of the rotor of the first resolver 110 connected directly to the input shaft 12in; $\theta_2$ represents the angle of the rotor of the second resolver 120 connected directly to the output shaft 12out; $\alpha$ represents the transformation ratio of the first resolver 110 and the second resolver 120; k represents the shaft angle multiplier of the first resolver 110 and the second resolver 120; $\phi$ represents phase delay; $\omega$ represents angular frequency; and t represents time.

The assist ECU 50 receives the first sin phase detection signal, the first cos phase detection signal, the second sin phase detection signal, and the second cos phase detection signal via the first sin phase detection line 212, the first cos phase detection line 213, the second sin phase detection line 222, and the second cos phase detection line 223, respectively. In the assist ECU 50, the first sin phase detection signal, the first cos phase detection signal, the second sin phase detection signal, and the second cos phase detection signal are input to amplifiers 51s1, 51c1, 51s2, 51c2, which amplify the voltages of the respective detection signals in relation to the ground potential. The amplified voltage signals are converted to digital values by use of an unillustrated A/D converter, and the digital values are input to the microcomputer, which performs torque calculation processing.

The torque computation section 32 of the assist ECU 50 is composed of a circuit which amplifies the first sin phase detection signal, the first cos phase detection signal, the second sin phase detection signal, and the second cos phase detection signal, converts them into digital signals, and inputs the digital signals into the microcomputer; the coil drive circuit 52; and a functional section in which the microcomputer performs the torque calculation processing.

Next, a method of calculating steering torque will be described. First, there will be described a method of calculating the rotational angle $\theta_1$ (the rotational angle of the input shaft 12in) from the first sin phase detection voltage Es1 and the first cos phase detection voltage Ec1 detected by the first resolver 110.

The following equation represents a value Ss1, which is obtained by integrating, over one period, the result obtained by multiplying the first sin phase detection voltage Es1 by a signal of $\sin(\omega t + \phi)$.

$$\int_0^{2\pi/\omega} \alpha \cdot A_1 \cdot \sin(k \cdot \theta_1) \cdot \sin(\omega t + \phi) \cdot \sin(\omega t + \phi) dt = \frac{\pi}{\omega} \cdot \alpha \cdot A_1 \cdot \sin(k \cdot \theta_1) = S_{s1}$$

Similarly, the following equation represents a value Sc1, which is obtained by integrating, over one period, the result obtained by multiplying the first cos phase detection voltage Ec1 by a signal of $\sin(\omega t + \phi)$.

$$\int_0^{2\pi/\omega} \alpha \cdot A_1 \cdot \cos(k \cdot \theta_1) \cdot \sin(\omega t + \phi) \cdot \sin(\omega t + \phi) dt = \frac{\pi}{\omega} \cdot \alpha \cdot A_1 \cdot \cos(k \cdot \theta_1) = S_{c1}$$

Accordingly, the rotational angle $\theta_1$ can be obtained from these two equations, and is represented by the following equation.

$$\theta_1 = \frac{1}{k} \cdot \tan^{-1} \frac{\sin(k \cdot \theta_1)}{\cos(k \cdot \theta_1)} = \frac{1}{k} \cdot \tan^{-1} \frac{S_{s1}}{S_{c1}}$$

Similarly, the rotational angle $\theta_2$ (the rotational angle of the output shaft 12out) can be obtained, in accordance with the following equation, from the second sin phase detection voltage Es2 and the second cos phase detection voltage Ec2 detected by the second resolver 120. In the following equation, Ss2 represents a value obtained by integrating, over one period, the result obtained by multiplying the second sin phase detection voltage Es2 by a signal of $\sin(\omega t + \phi)$; and Sc2 represents a value obtained by integrating, over one period, the result obtained by multiplying the second cos phase detection voltage Ec2 by a signal of $\sin(\omega t + \phi)$.

$$\theta_2 = \frac{1}{k} \cdot \tan^{-1} \frac{\sin(k \cdot \theta_2)}{\cos(k \cdot \theta_2)} = -\frac{1}{k} \cdot \tan^{-1} \frac{S_{s2}}{S_{c2}}$$

The reason why a negative sign (−) is added in the above-described equation is that the second excitation signal ($V_2 = -A_2 \cdot \sin(\omega t)$) used in the second resolver 120 is opposite in phase to the first excitation signal ($V_1 = A_1 \cdot \sin(\omega t)$) used in the first resolver 110.

The torque computation section 32 calculates the steering torque Tr from the rotational angle $\theta_1$ and the rotational angle $\theta_2$ in accordance with the following equation.

$$Tr = Kb \cdot (\theta_1 - \theta_2)$$

Here, Kb is a proportional constant determined in accordance with the twisting characteristic of the torsion bar 12a, and is stored in the microcomputer in advance.

Notably, the above-described calculation is applied to a continuous system. Accordingly, the torque computation section 32, which performs computation processing by use of a microcomputer, samples the detection voltages Es1, Ec1, Es2, Ec2 at equal intervals determined, for example, such that the sampling is performed three or more times within a single period of the excitation signal. The torque computation section 32 then multiplies each of the sampled detection voltages Es1, Ec1, Es2, Ec2 by sin (ωt+φ), and adds together the values obtained through the multiplication within the single period (for example, the values obtained through the multiplication of three times). Thus, the above-described values Ss1, Sc1, Ss2, Sc2 can be obtained.

Since these values Ss1, Sc1, Ss2, Sc2 become values corresponding to the amplitudes of the detection voltages Es1, Ec1, Es1, Ec2 (values obtained by multiplying the amplitudes by a constant), hereinafter, the values Ss1, Sc1, Ss2, Sc2 will be referred to as amplitudes Ss1, Sc1, Ss2, Sc2.

Next, operation of the torque computation section 32 for the case where one of the excitation lines 210, 220 and the ground line 240 is broken will be described. Such wire breakage occurs because of breakage of the wire harness laid between the assist ECU 50 and the resolver unit 100 or connection failure of connectors which connect the wire harness to the assist ECU 50 and the resolver unit 100. Accordingly, here, wire breakage within the resolver unit 100 is assumed not to occur.

Figure 4:
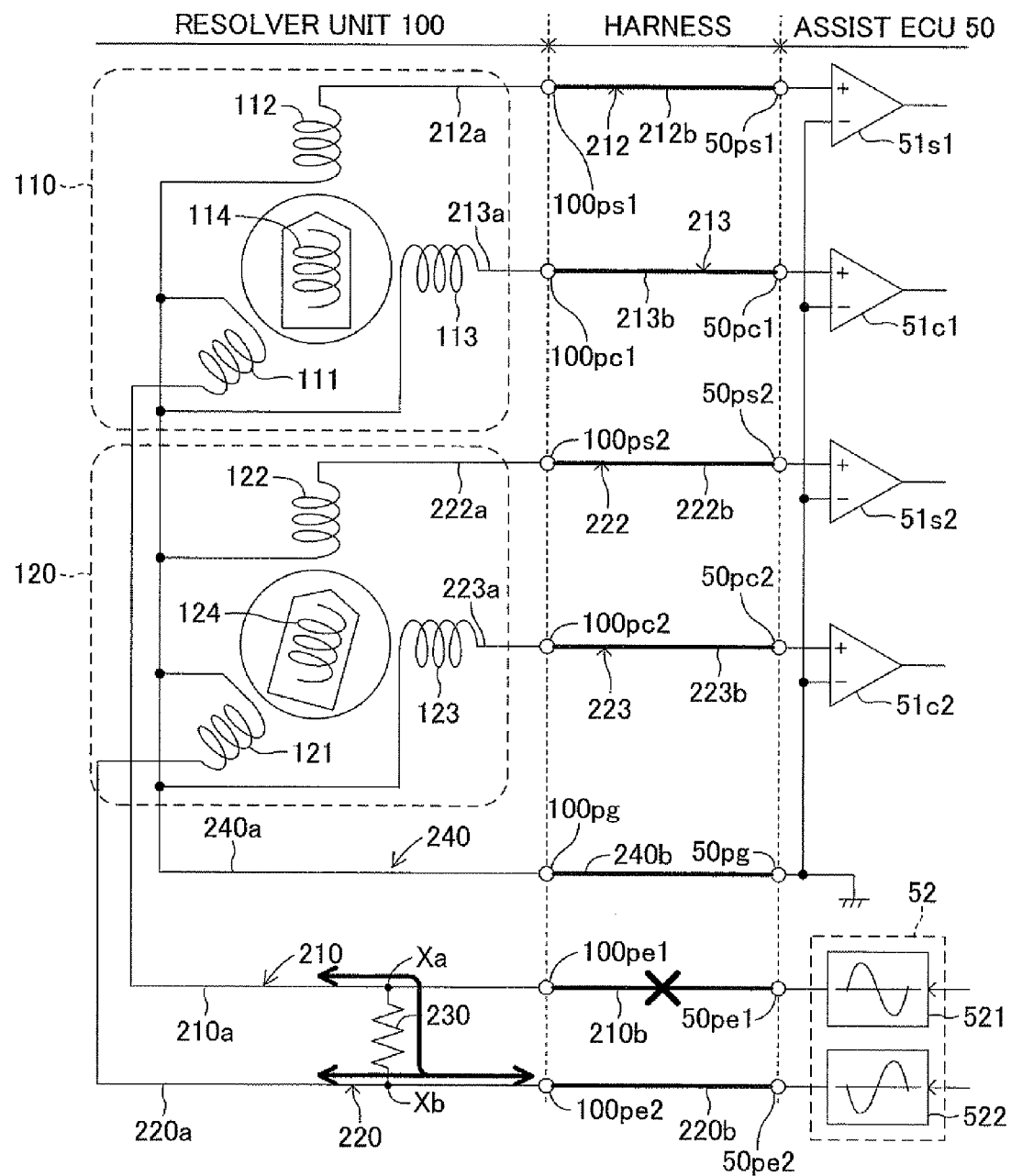
FIG. 4 is an electrical circuit diagram showing breakage of a first excitation line.

First, operation for the case where the first excitation line 210 is broken will be described. As shown in FIG. 4, when the first excitation line 210 (the external first excitation line 210b) is broken, the second excitation signal is supplied to the resolver unit 100 through the external second excitation line 220b only. In this case, the second excitation signal output from the assist ECU 50 flows through a route which branches into two routes at the connection point Xb of the electric resistance element 230 connected to the internal second excitation line 220a. One route extends from the connection point Xb to the second excitation coil 121 via the internal second excitation line 220a. The other route extends from the connection point Xb to the first excitation coil 111 via the electric resistance element 230 and the internal first excitation line 210a. The current flowing into the first excitation coil 111 and the second excitation coil 121 flows through the common ground line 240, and returns to the assist ECU 50. Thus, the first excitation coil 111 and the second excitation coil 121 are excited. Notably, since the excitation signal is AC voltage, current also flows through the above-described routes in the opposite direction. However, here, the flow of current in a state in which a positive voltage is applied is described.

In this case, due to the influence of the electric resistance element 230, the current flowing through the first excitation coil 111 decreases as compared with an ordinary state. Therefore, the first sin phase detection voltage Es1 and the first cos phase detection voltage Ec1 decrease. However, the ratio of the detection voltages relating to the calculation of the rotational angle $\theta_1$ is the same as that in the ordinary state. Accordingly, breakage of the first excitation line 210 does not affect the result of calculation of the rotational angle $\theta_1$. Notably, in this case, since the excitation AC signals of the same phase are supplied to the first excitation coil 111 and the second excitation coil 121, for calculation of the rotational angle $\theta_1$, a negative sign must be added to the result of the calculation (the result of the calculation must be multiplied by −1).

Figure 5:
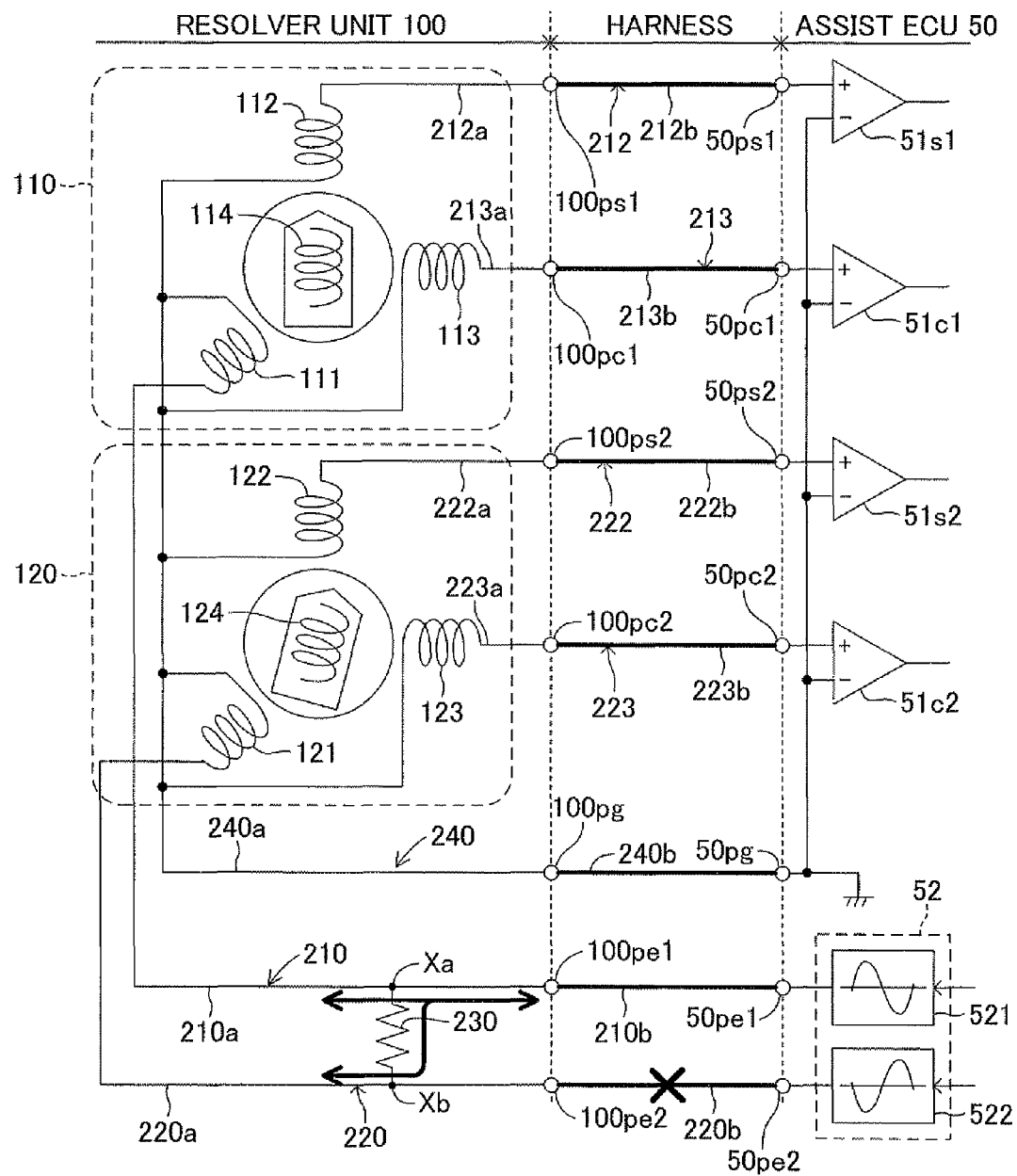
FIG. 5 is an electrical circuit diagram showing breakage of a second excitation line.

Next, operation for the case where the second excitation line 220 is broken will be described. As shown in FIG. 5, when the second excitation line 220 (the external second excitation line 220b) is broken, the first excitation signal is supplied to the resolver unit 100 through the external first excitation line 210b only. In this case, the first excitation signal output from the assist ECU 50 flows through a route which branches into two routes at the connection point Xa of the electric resistance element 230 connected to the internal first excitation line 210a. One route extends from the connection point Xa to the first excitation coil 111 via the internal first excitation line 210a. The other route extends from the connection point Xa to the second excitation coil 121 via the electric resistance element 230 and the internal second excitation line 220a. The current flowing into the first excitation coil 111 and the second excitation coil 121 flows through the common ground line 240, and returns to the assist ECU 50. Thus, the first excitation coil 111 and the second excitation coil 121 are excited.

In this case, due to the influence of the electric resistance element 230, the current flowing through the second excitation coil 121 decreases as compared with an ordinary state. Therefore, the second sin phase detection voltage Es2 and the second cos phase detection voltage Ec2 decrease. However, the ratio of the detection voltages relating to the calculation of the rotational angle $\theta_2$ is the same as that in the ordinary state. Accordingly, breakage of the second excitation line 220 does not affect the result of calculation of the rotational angle $\theta_2$. Notably, in this case, since the excitation AC signals of the same phase are supplied to the first excitation coil 111 and the second excitation coil 121, for calculation of the rotational angle $\theta_2$, the negative sign (multiplication by −1) must be deleted.

In the case where the first excitation line 210 is broken, the first sin phase detection voltage Es1 and the first cos phase detection voltage Ec1 decrease. In the case where the second excitation line 220 is broken, the second sin phase detection voltage Es2 and the second cos phase detection voltage Ec2 decrease. Therefore, the torque computation section 32 can detect wire breakage on the basis of drops in the detection voltages, and can specify the broken excitation line.

In view of the above, the torque computation section 32 determines a broken excitation line on the basis of the amplitudes Ss1, Sc1, Ss2, Sc2 obtained for calculation of the rotational angles $\theta_1$, $\theta_2$. Specifically, when the value $(Ss1^2 + Sc1^2)$ of the sum of squares of the amplitudes Ss1, Sc1 is less than a reference value Se, the torque computation section 32 determines that the first excitation line 210 is broken. Similarly, when the value $(Ss2^2 + Sc2^2)$ of the sum of squares of the amplitudes Ss2, Sc2 is less than the reference value Se, the torque computation section 32 determines that the second excitation line 220 is broken. This reference value Se is a value previously set for determining whether or not wire breakage is present. The torque computation section 32 can compute the steering torque Tr properly by correcting the sign (positive or negative) of the rotational angle $\theta_1$ or the rotational angle $\theta_2$ upon detection of wire breakage.

Figure 6:
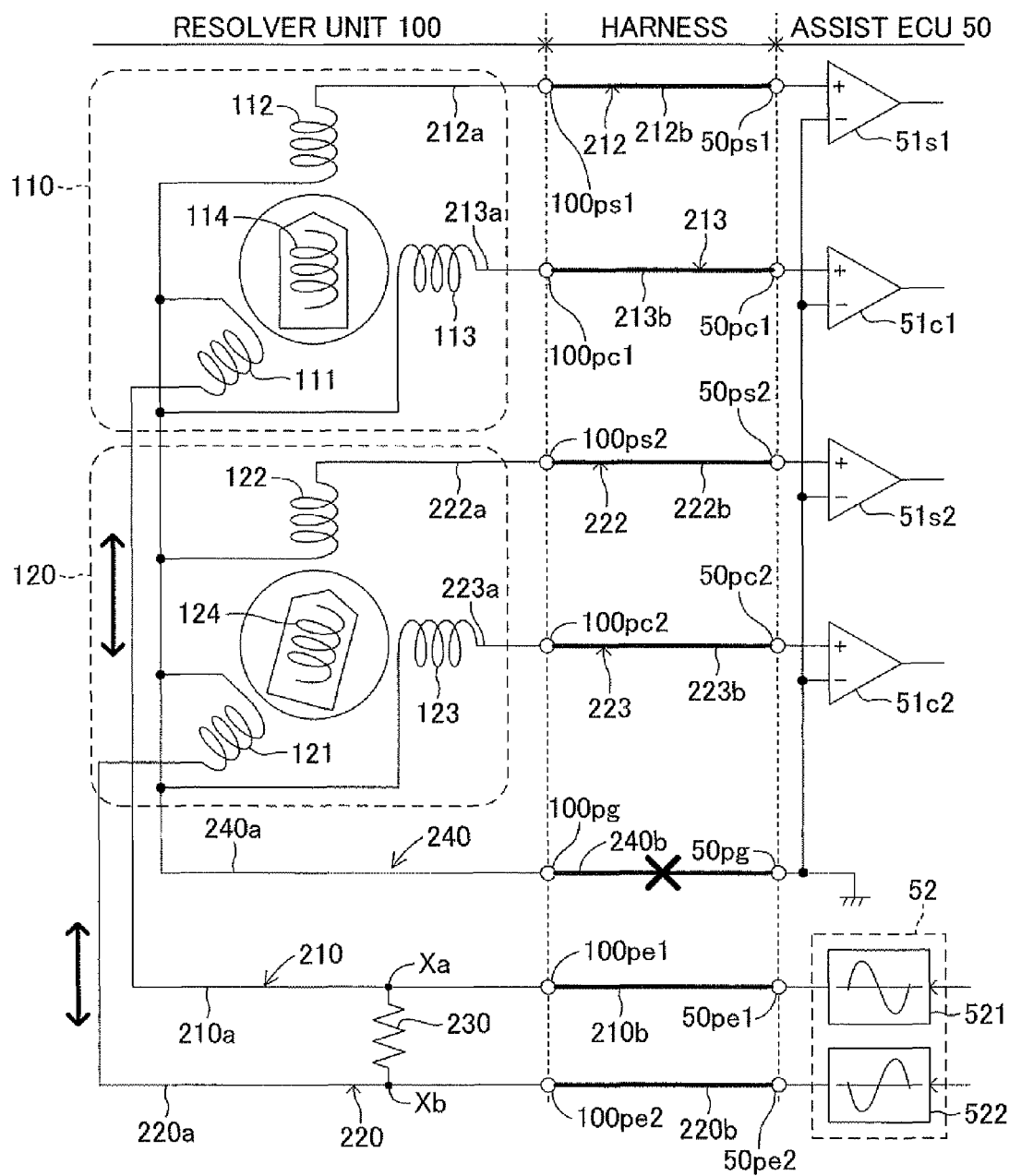
FIG. 6 is an electrical circuit diagram showing breakage of a ground line.

Next, operation for the case where the ground line 240 is broken will be described. Here, the case where the external ground line 240b is broken as shown in FIG. 6 will be considered. In this case, the first excitation line 210 and the second excitation line 220 are assumed to be normal. Excitation AC signals which are opposite each other in phase are supplied to one end of the first excitation coil 111 and one end of the second excitation coil 121, respectively, and the other end of the first excitation coil 111 and the other end of the second excitation coil 121 are connected to the common ground line 240. Accordingly, as can be understood from the following equation, the potential Vg of the ground line 240 is zero volt.

$$Vg=(V_1+V_2)/2=0$$

This means that, even when the external ground line 240b is broken, the potential of the internal ground line 240a, which is a portion of the ground line 240 within the resolver unit 100, can be maintained at zero volt. Therefore, the first sin phase detection coil 112, the first cos phase detection coil 113, the second sin phase detection coil 122, and the second cos phase detection coil 123 can operate normally. Thus, the torque computation section 32 can detect the output voltages (detection voltages) of the first sin phase detection coil 112, the first cos phase detection coil 113, the second sin phase detection coil 122, and the second cos phase detection coil 123 in the same manner as in the ordinary state (in the state in which wire breakage is not present). Accordingly, the torque computation section 32 can obtain the steering torque Tr, through computation, from the rotational angles $\theta_1$, $\theta_2$.

In this case, since the detection voltages of the first sin phase detection coil 112, the first cos phase detection coil 113, the second sin phase detection coil 122, and the second cos phase detection coil 123 do not change from those in the ordinary state, the torque computation section 32 cannot detect the breakage of the ground line 240. Although the torque computation section 32 can detect the steering torque Tr normally even when the ground line 240 is broken, it becomes impossible to detect the steering torque Tr if the first excitation line 210 or the second excitation line 220 is also broken, which results in occurrence of a double failure. In order to overcome such a problem, through execution of ground wire breakage detection processing, the torque computation section 32 detects the breakage of the ground line 240 in an early stage, and reports the necessity of repair to a driver. This ground wire breakage detection processing will be described later.

Figure 7:
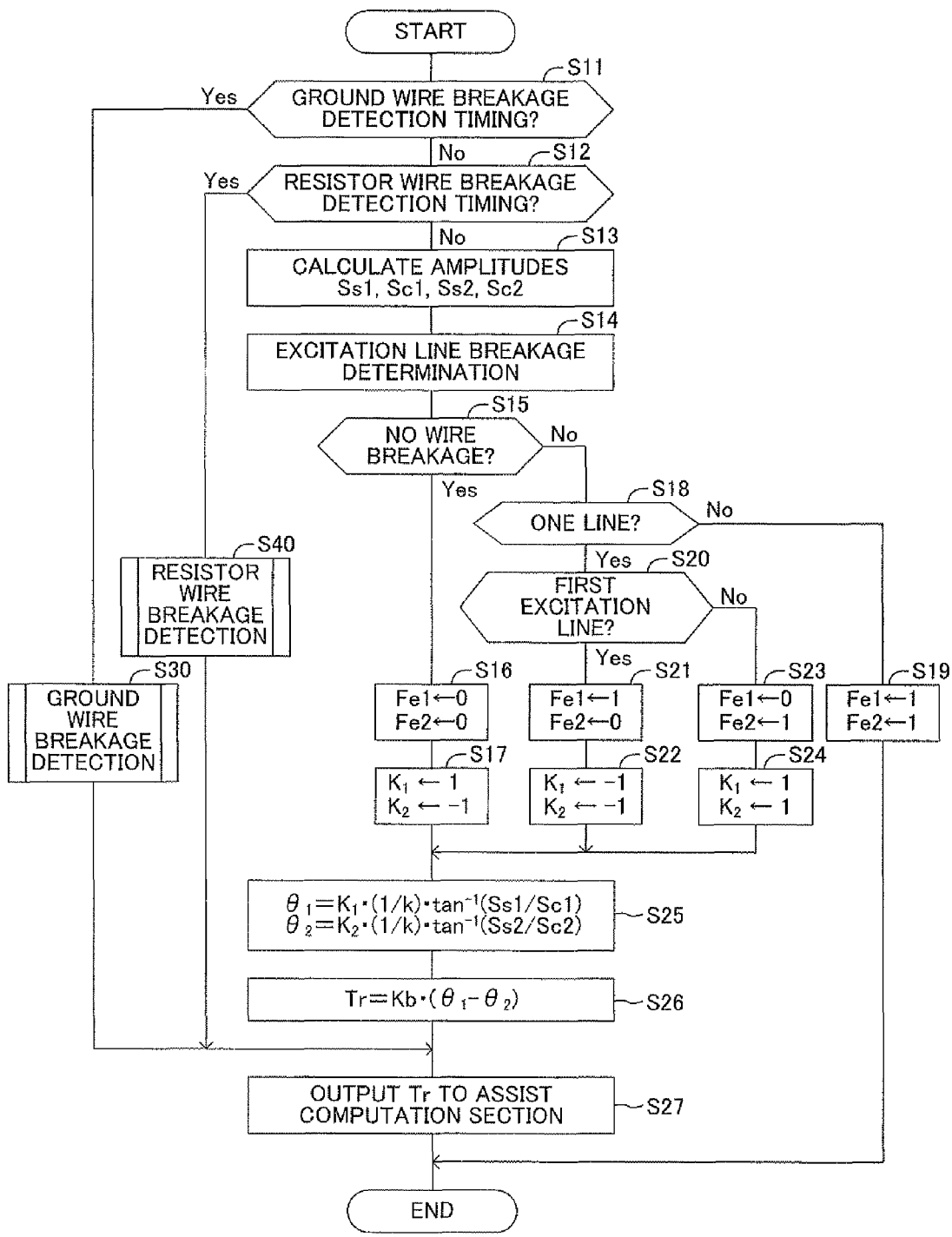
FIG. 7 is a flowchart showing a steering torque detection routine.

Next, steering torque detection processing executed by the torque computation section 32 will be described. FIG. 7 is a flowchart showing a steering torque detection routine. The steering torque detection routine is stored in the ROM of the microprocessor as a control program. The steering torque detection routine is repeatedly executed at predetermined short intervals during a period during which an ignition key is in an ON state. Notably, simultaneously with the start of the steering torque detection routine, the torque computation section 32 operates the coil drive circuit 52 so as to start the output of the first excitation signal from the first excitation signal output port 50pe1 and the output of the second excitation signal from the second excitation signal output port 50pe2.

In step S11, the torque computation section 32 determines whether or not timing for performing ground wire breakage detection processing has come. The ground wire breakage detection processing is diagnosis processing for determining whether or not the external ground line 240b is broken, and is performed at previously set, predetermined intervals. Here, the case where the timing for performing the ground wire breakage detection processing has not yet come will be described first. In the case where the timing for performing the ground wire breakage detection processing has not yet come (S11: No), in step S12 subsequent to step S11, the torque computation section 32 determines whether or not timing for performing resistor wire breakage detection processing has come. This resistor wire breakage detection processing is diagnosis processing for detecting wire breakage of the electric resistance element 230; that is, processing for determining whether or not the electric resistance element 230 electrically connects the internal first excitation line 210a and the internal second excitation line 220a together. This processing is performed at previously set, predetermined intervals. Here, the case where the timing for performing the resistor wire breakage detection processing has not yet come will be described first.

In the case where the timing for performing the resistor wire breakage detection processing has not yet come (S12: No), in step S13 subsequent thereto, the torque computation section 32 acquires the sampled detection voltages Es1, Ec1, Es2, Ec2, and calculates the amplitudes Ss1, Sc1, Ss2, Sc2 on the basis of the detection voltages Es1, Ec1, Es2, Ec2.

In a subroutine different from the steering torque detection routine, the torque computation section 32 samples the instantaneous values of the detection voltages Es1, Ec1, Es2, Ec2 at sampling intervals determined such that the sampling is performed three or more times in each period of the excitation signal. The processing of this step S13 multiplies each of the detection voltages Es1, Ec1, Es2, Ec2 sampled in the sampling routine by $\sin(\omega t+\phi)$, and adds together the values obtained through the multiplication within the single period of the excitation signal, to thereby calculate the amplitudes Ss1, Sc1, Ss2, Sc2.

Subsequently, in step S14, the torque computation section 32 determines, on the basis of the amplitudes Ss1, Sc1, Ss2, Sc2, whether or not the first excitation line 210 (the external first excitation line 210b) or the second excitation line 220 (the external second excitation line 220b) is broken. In the present embodiment, when the value $(Ss1^2+Sc1^2)$ of the sum of squares of the amplitudes Ss1, Sc1 is less than the reference value Se, the torque computation section 32 determines that the first excitation line 210 is broken. Similarly, when the value $(Ss2^2+Sc2^2)$ of the sum of squares of the amplitudes Ss2, Sc2 is less than the reference value Se, the torque computation section 32 determines that the second excitation line 220 is broken. This reference value Se is a set value for determining whether or not wire breakage is present, which is set in advance such that, when the first excitation line 210 (or the second excitation line 220) is not broken, the value $(Ss1^2+Sc1^2)$ (or the value $(Ss2^2+Sc2^2)$) becomes greater than the reference value Se, and, when the first excitation line 210 (or the second excitation line 220) is broken, the value $(Ss1^2+Sc1^2)$ (or the value $(Ss2^2+Sc2^2)$) becomes less than the reference value Se.

In step S15, the torque computation section 32 determines whether or not none of the first excitation line 210 and the second excitation line 220 is broken. In the case where the torque computation section 32 determines that none of the first excitation line 210 and the second excitation line 220 is broken, (S15: Yes), in step S16, the torque computation section 32 sets both a first-excitation-line-breakage determination flag Fe1 and a second-excitation-line-breakage determination flag Fe2 to "0." Each of the first-excitation-line-breakage determination flag Fe1 and the second-excitation-line-breakage determination flag Fe2 represents that wire breakage has been detected when it is set to "1," and each of the first-excitation-line-breakage determination flag Fe1 and the second-excitation-line-breakage determination flag Fe2 represents that no wire breakage has been detected when it is set to "0."

Subsequently, in step S17, the torque computation section 32 sets the sign $K_1$ used in the equation for calculating the rotational angle $\theta_1$ to "1" (positive), and sets the sign $K_2$ used in the equation for calculating the rotational angle $\theta_2$ to "−1" (negative).

In the case where the torque computation section 32 determines in step S15 that the first excitation line 210 or the second excitation line 220 is broken, in step S18, the torque computation section 32 determines whether or not only one excitation line is broken. In the case where the torque computation section 32 determines that the first excitation line 210 and the second excitation line 220 are both broken (S18: No), in step S19, the torque computation section 32 sets both the first-excitation-line-breakage determination flag Fe1 and the second-excitation-line-breakage determination flag Fe2 to "1," and ends the current execution of the steering torque detection routine. In this case, since detection of steering torque becomes impossible, calculation of the steering torque Tr is not performed.

In the case where the torque computation section 32 determines in step S18 that one of the first excitation line 210 and the second excitation line 220 is broken, in step S20, the torque computation section 32 determines whether or not only the first excitation line 210 is broken. In the case where the torque computation section 32 determines that only the first excitation line 210 is broken, in step S21, the torque computation section 32 sets the first-excitation-line-breakage determination flag Fe1 to "1," and sets the second-excitation-line-breakage determination flag Fe2 to "0." Subsequently, in step S22, the torque computation section 32 sets the sign $K_1$ used in the equation for calculating the rotational angle $\theta_1$ to "−1," and sets the sign $K_2$ used in the equation for calculating the rotational angle $\theta_2$ to "−1."

In the case where the torque computation section 32 determines in step S20 that only the second excitation line 220 is broken (S20: No), in step S23, the torque computation section 32 sets the first-excitation-line-breakage determination flag Fe1 to "0," and sets the second-excitation-line-breakage determination flag Fe2 to "1." Subsequently, in step S24, the torque computation section 32 sets the sign $K_1$ used in the equation for calculating the rotational angle $\theta_1$ to "1" and sets the sign $K_2$ used in the equation for calculating the rotational angle $\theta_2$ to "1."

After having set the signs $K_1$, $K_2$ in step S17, step S22, or step S24, the torque computation section 32 proceeds to step S25. In step S25, the torque computation section 32 calculates the rotational angle $\theta_1$ and the rotational angle $\theta_2$ in accordance with the following equations.

$$\theta_1 = K_1 \cdot (1/k) \cdot \tan^{-1}(Ss1/Sc1)$$

$$\theta_2 = K_2 \cdot (1/k) \cdot \tan^{-1}(Ss2/Sc2)$$

Subsequently, in step S26, the torque computation section 32 calculates the steering torque Tr in accordance with the following equation.

$$Tr = Kb \cdot (\theta_1 - \theta_2)$$

Subsequently, in step S27, the torque computation section 32 outputs the calculated steering torque Tr to the assist computation section 31. The assist computation section 31 calculates a target assist torque from this steering torque Tr, and outputs a PWM control signal to the motor drive circuit 40 such that a target current corresponding to the target assist torque flows through the electric motor 21. As a result, the electric motor 21 generates a proper steering assist torque.

After having performed the processing of step S27 or step S19, the torque computation section 32 ends the steering torque detection routine. Subsequently, the torque computation section 32 repeats the steering torque detection routine at predetermined short intervals.

In the case where the torque computation section 32 determines in step S11 that the ground wire breakage detection timing has come, the torque computation section 32 proceeds to step S30. As described above, the torque detection apparatus of the present embodiment can continue detection of the steering torque Tr even after the ground line 240 (the external ground line 240b) breaks. However, in the case were the first excitation line 210 or the second excitation line 220 breaks in addition to the ground line 240, detection of the steering torque Tr becomes impossible. In order to overcome such a problem, the torque computation section 32 regularly executes the ground wire breakage detection processing so as to detect breakage of the ground line 240 in an early stage, and prompt the driver to repair the failure. Notably, preferably, this ground wire breakage detection processing is performed immediately after the start of the steering torque detection routine, and is performed regularly at previously set intervals after the start of the steering torque detection routine.

Figure 8:
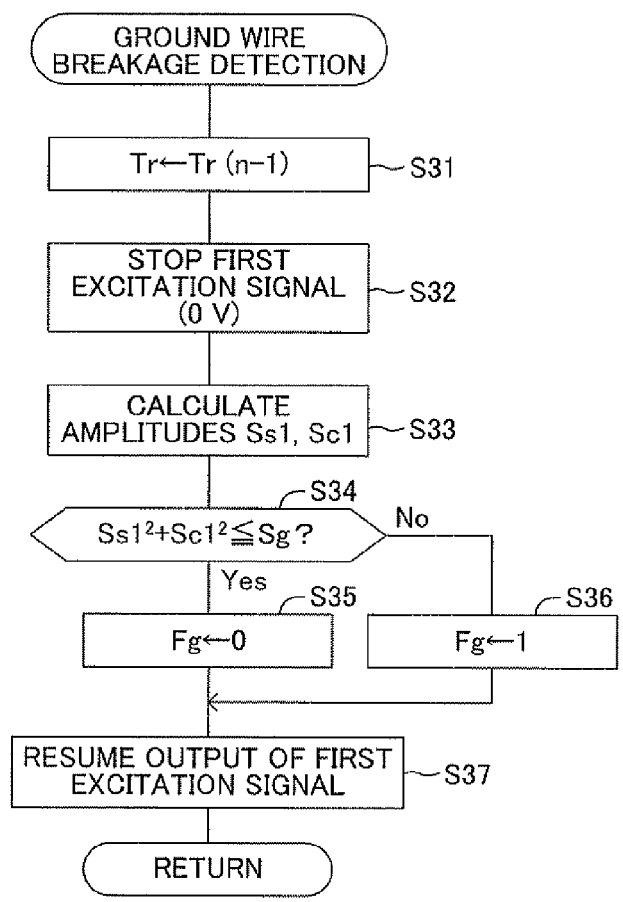
FIG. 8 is a flowchart showing a ground wire breakage detection subroutine.

FIG. 8 shows a ground wire breakage detection subroutine performed in step S30 of the steering torque detection routine. When the ground wire breakage detection subroutine is started, in step S31, the torque computation section 32 sets or stores, as a steering torque Tr for this time, a steering torque Tr(n−1) calculated in the steering torque detection routine performed last time (in the previous control cycle). This setting operation is performed because, as described later, the steering torque cannot be detected during the ground wire breakage detection processing is performed. Notably, when the ground wire breakage detection processing is performed immediately after the start of the steering torque detection routine, the steering torque Tr is set to zero.

In step S32 subsequent to step S31, the torque computation section 32 stops the first excitation signal output from the first excitation signal output port 50pe1 to thereby fix the potential of the first excitation signal output port 50pe1 to zero volt. In this case, if the external ground line 240b is not broken, no excitation current flows through the first excitation coil 111. Accordingly, basically, the detection voltage Es1 of the first sin phase detection coil 112 and the detection voltage Ec1 of the first cos phase detection coil 113 become zero volt. Meanwhile, if the external ground line 240b is broken, the second excitation signal output from the second excitation signal output port 50pe2 flows into the second excitation coil 121 via the second excitation line 220, flows into the first excitation coil 111 via the internal ground line 240a, and then returns to the assist ECU 50 via the first excitation line 210. Therefore, the potential of the internal ground line 240a becomes ½ of the excitation voltage. Accordingly, a voltage is generated at each of the first sin phase signal input port 50ps1 and the first cos phase signal input port 50pc1 of the assist ECU 50.

The torque computation section 32 diagnoses breakage of the external ground line 240b by making use of such characteristics. In step S33, the torque computation section 32 calculates the amplitudes Ss1, Sc1 by the above-described method. Subsequently, in step S34, the torque computation section 32 determines whether or not the value $(Ss1^2 + Sc1^2)$ of the sum of squares of the amplitude Ss1, Sc1 is equal to or less than a reference value Sg. This reference value Sg is a set value for determining whether or not wire breakage is present, which is set in advance such that, when the external ground line 240b is not broken, the value $(Ss1^2 + Sc1^2)$ becomes smaller than the reference value Sg, and, when the external ground line 240b is broken, the value $(Ss1^2 + Sc1^2)$ becomes greater than the reference value Sg. In the case where the external ground line 240b is not broken, basically, the amplitudes Ss1, Sc1 become zero. However, since a voltage stemming from noise may be detected, the reference value Sg is set in consideration of noise, etc.

In the case where the torque computation section 32 determines that the value $(Ss1^2 + Sc1^2)$ of the sum of squares of the amplitude Ss1, Sc1 is equal to or less than the reference value Sg (S34: Yes), in step S35, the torque computation section 32 sets a ground-line-breakage determination flag Fg to "0." Meanwhile, in the case where the torque computation section 32 determines that the value ($Ss1^2+Sc1^2$) of the sum of squares of the amplitude Ss1, Sc1 is greater than the reference value Sg (S34: No), in step S36, the torque computation section 32 sets the ground-line-breakage determination flag Fg to "1." The ground-line-breakage determination flag Fg represents that wire breakage has been detected when it is set to "1," and represents that no wire breakage is detected when it is set to "0."

After having set the ground-line-breakage determination flag Fg, in step S37, the torque computation section 32 resumes the output of the first excitation signal from the first excitation signal output port 50*pe*1. Accordingly, detection of the steering torque Tr becomes possible again. After having performed the processing of step S37, the torque computation section 32 ends the present subroutine, and proceeds to step S27 of the main routine. In this case, in step S27, the steering torque Tr set in the step S31 is output to the assist computation section 31.

Notably, in the present embodiment, for detection of breakage of the ground line 240, the output of the first excitation signal is stopped in step S32. However, instead of stopping the output of the first excitation signal, the output of the second excitation signal may be stopped so as to fix its output voltage to zero volt. In this case, in steps S33 and S34, the value ($Ss2^2+Sc2^2$) of the sum of squares of the amplitudes Ss2, Sc2 is calculated, and is compared with the reference value Sg.

In the case where the torque computation section 32 determines in step S12 of the steering torque detection routine (FIG. 7) that the resistor wire breakage detection timing has come, the torque computation section 32 proceeds to step S40. As described above, the torque detection apparatus of the present embodiment can detect the steering torque Tr even when one of the external excitation lines 210*b* and 220*b* breaks. However, under the condition where the electric resistance element 230 is broken (wire breakage), breakage of one of the external excitation lines 210*b* and 220*b* makes it impossible to detect the steering torque Tr. In order to overcome such a problem, the torque computation section 32 regularly executes the resistor wire breakage detection processing so as to detect wire breakage of the electric resistance element 230 in an early stage, and prompt the driver to repair the failure. Notably, preferably, this resistor wire breakage detection processing is performed immediately after the start of the steering torque detection routine, and is performed regularly at previously set intervals after the start of the steering torque detection routine.

Figure 9:
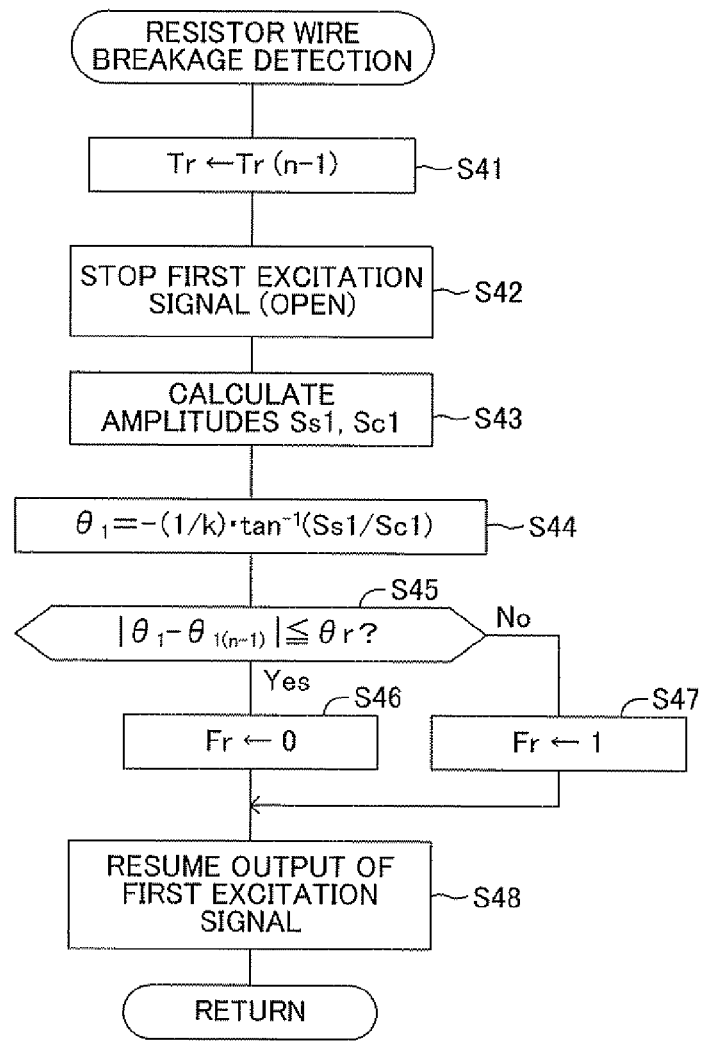
FIG. 9 is a flowchart showing a resistor wire breakage detection subroutine.

FIG. 9 shows a resistor wire breakage detection subroutine performed in step S40 of the steering torque detection routine. When the resistor wire breakage detection subroutine is started, in step S41, the torque computation section 32 sets or stores, as a steering torque Tr for this time, a steering torque Tr(n−1) calculated in the steering torque detection routine performed last time (in the previous control cycle). This setting operation is performed because, as described later, the steering torque cannot be detected during the resistor wire breakage detection processing is performed. Notably, when the resistor wire breakage detection processing is performed immediately after the start of the steering torque detection routine, the steering torque Tr is set to zero.

In step S42 subsequent to step S41, the torque computation section 32 stops the first excitation signal from the first excitation signal output port 50*pe*1, and brings the first excitation signal output port 50*pe*1 into an open state (high impedance). This creates a state which is the same as the state in which the external first excitation line 210*b* is broken. Accordingly, the rotational angle $\theta_1$ can be detected properly if the rotational angle $\theta_1$ is calculated by use of a control logic for the case where the external first excitation line 210*b* is broken; i.e., by setting the sign $K_1$ to "−1." The torque computation section 32 detects the breakage of the electric resistance element 230 by making use of such a characteristic.

In step S43, the torque computation section 32 calculates the amplitudes Ss1, Sc1 by the above-described method. Subsequently, in step S44, the torque computation section 32 calculates the rotational angle $\theta_1$ in accordance with the following equation.

$$\theta_1 = -(1/k) \cdot \tan^{-1}(Ss1/Sc1)$$

Subsequently, in step S45, the torque computation section 32 calculates the difference $\Delta\theta_1$ ($=|\theta_1-\theta_1(n-1)|$) between the rotational angle $\theta_1(n-1)$ calculated in step S25 of the steering torque detection routine performed last time (in the previous control cycle), and the rotational angle $\theta_1$ calculated in step S44 in the present control cycle. The torque computation section 32 then determines whether or not the difference $\Delta\theta_1$ is equal to or less than a reference value $\theta r$. This reference value $\theta r$ is a set value for determining whether or not wire breakage is present, which is set in advance such that, when the electric resistance element 230 is not broken, the difference $\Delta\theta_1$ becomes less than the reference value $\theta r$, and, when the electric resistance element 230 is broken, the difference $\Delta\theta_1$ becomes greater than the reference value $\theta r$.

In the case where the torque computation section 32 determines that the difference $\Delta\theta_1$ is equal to or less than the reference value $\theta r$ (S45: Yes), in step S46, the torque computation section 32 sets a resistor-breakage determination flag Fr to "0." Meanwhile, in the case where the torque computation section 32 determines that the difference $\Delta\theta_1$ is greater than the reference value $\theta r$ (S45: No), in step S47, the torque computation section 32 sets the resistor-breakage determination flag Fr to "1." The resistor-breakage determination flag Fr represents that wire breakage has been detected when it is set to "1," and represents that no wire breakage is detected when it is set to "0."

After having set the resistor-breakage determination flag Fr, the torque computation section 32 resumes the output of the first excitation signal from the first excitation signal output port 50*pe*1 in step S48. Accordingly, detection of the steering torque Tr becomes possible again. After having performed the processing of step S48, the torque computation section 32 ends the present subroutine, and proceeds to step S27 of the main routine. In this case, in step S27, the steering torque Tr set in the step S41 is output to the assist computation section 31.

Notably, in the present embodiment, for detection of breakage of the electric resistance element 230, the first excitation signal output port 50*pe*1 is brought into an open state in step S42. However, instead of bringing the first excitation signal output port 50*pe*1 into an open state, the second excitation signal output port 50*pe*2 may be brought into an open state. In this case, in steps S43 to S45, the rotational angle $\theta_2$ is calculated on the basis of the amplitudes Ss2, Sc2, and wire breakage is determined on the basis of the difference between this rotational angle $\theta_2$ and the rotational angle $\theta_2(n-1)$ obtained last time.

Next, wire breakage anomaly processing executed by the torque computation section 32 will be described. In the above-described steering torque detection routine, a determination is made as to whether or not wire breakage occurs at the external first excitation line 210*b*, the external second excitation line 220*b*, the external ground line 240*b*, or the electric resistance element 230. In this wire breakage anomaly processing, on the basis of the results of the wire breakage determination, anomaly is reported to the driver, and stoppage of steering assist is instructed to the assist computation section 31.

Figure 10:
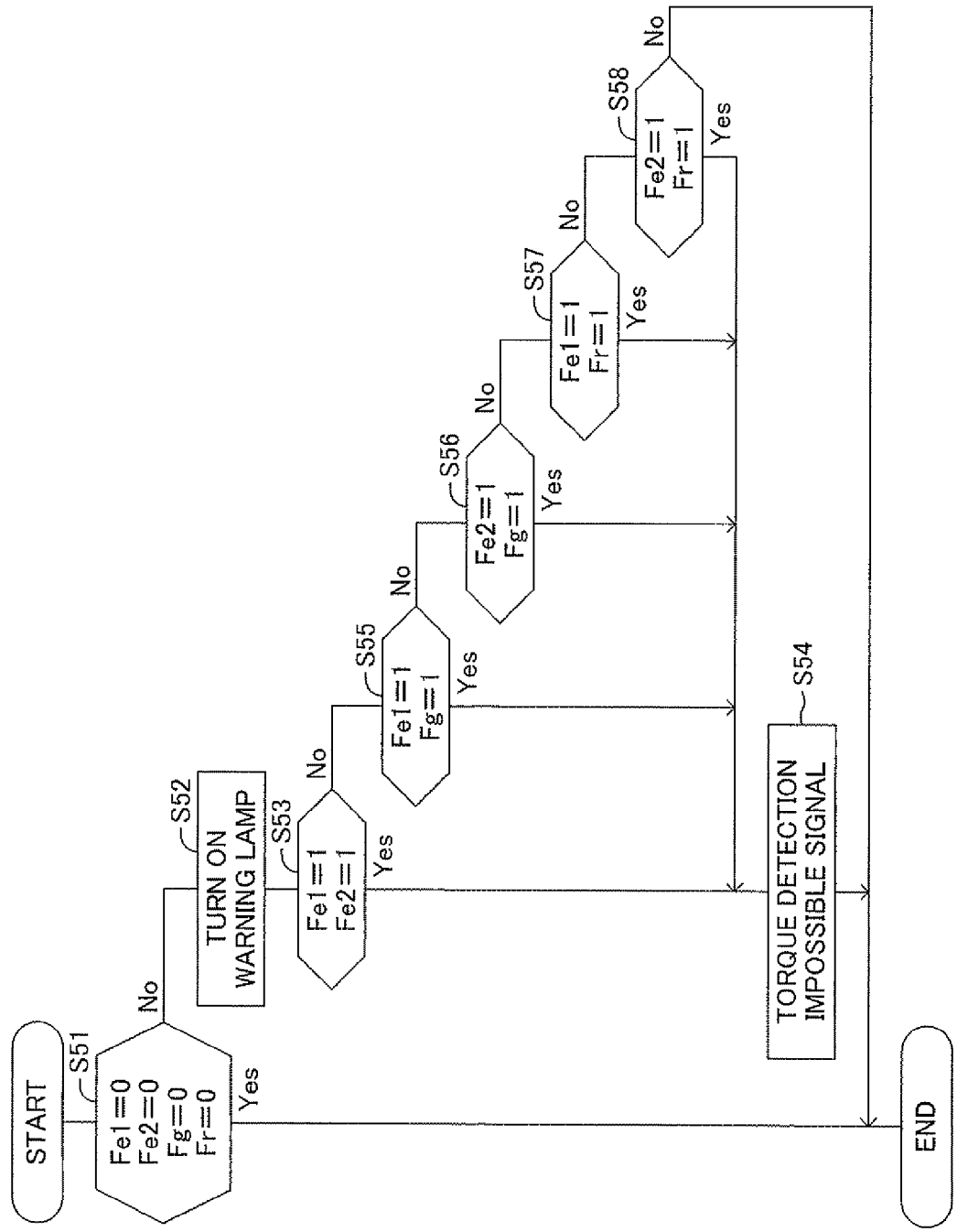
FIG. 10 is a flowchart showing a wire breakage anomaly processing routine.

FIG. 10 is a flowchart showing a wire breakage anomaly processing routine. The wire breakage anomaly processing routine is stored in the ROM of the microcomputer as a control program. The wire breakage anomaly processing routine is repeatedly executed at predetermined short intervals, parallel with the above-described steering torque detection routine.

When the wire breakage anomaly processing routine is started, in step S51, the torque computation section 32 determines whether or not all the first-excitation-line-breakage determination flag Fe1, the second-excitation-line-breakage determination flag Fe2, the ground-line-breakage determination flag Fg, and the resistor-breakage determination flag Fr are set to "0." In the case where all the flags are set to "0"; that is, in the case where wire breakage is detected nowhere, the torque computation section 32 ends the current execution of the present routine.

Meanwhile, in the case where any of the four wire breakage determination flags Fe1, Fe2, Fg, Fr is set to "1," in step S52, the torque computation section 32 turns on a warning lamp 65 of the vehicle. This enables the driver to recognize that an anomaly has occurred. Subsequently, in step S53, the torque computation section 32 determines whether or not both the first-excitation-line-breakage determination flag Fe1 and the second-excitation-line-breakage determination flag Fe2 are set to "1." In the case where both the two wire breakage determination flags Fe1, Fe2 are set to "1" (S53: Yes), the steering torque Tr cannot be detected. Therefore, in step S54, the torque computation section 32 outputs a torque detection impossible signal to the assist computation section 31. As a result, the assist computation section 31 stops the steering assist control.

Meanwhile, in the case where the torque computation section 32 makes a "No" determination in step S53, the torque computation section 32 determines in step S55 whether or not both the first-excitation-line-breakage determination flag Fe1 and the ground-line-breakage determination flag Fg are set to "1." In the case where the two wire breakage determination flags Fe1, Fg are set to "1" (S55: Yes) as well, the steering torque Tr cannot be detected. Therefore, the torque computation section 32 performs the processing of step S54.

Meanwhile, in the case where the torque computation section 32 makes a "No" determination in step S55, the torque computation section 32 determines in step S56 whether or not both the second-excitation-line-breakage determination flag Fe2 and the ground-line-breakage determination flag Fg are set to "1." In the case where the two wire breakage determination flags Fe2, Fg are set to "1" (S56: Yes) as well, the steering torque Tr cannot be detected. Therefore, the torque computation section 32 performs the processing of step S54.

Furthermore, in the case where the torque computation section 32 makes a "No" determination in step S56, the torque computation section 32 determines in step S57 whether or not both the first-excitation-line-breakage determination flag Fe1 and the resistor-breakage determination flag Fr are set to "1." In the case where the two wire breakage determination flags Fe1, Fr are set to "1" (S57: Yes) as well, the steering torque Tr cannot be detected. Therefore, the torque computation section 32 performs the processing of step S54.

Furthermore, in the case where the torque computation section 32 makes a "No" determination in step S57, the torque computation section 32 determines in step S58 whether or not both the second-excitation-line-breakage determination flag Fe2 and the resistor-breakage determination flag Fr are set to "1." In the case where the two wire breakage determination flags Fe2, Fr are set to "1" (S58: Yes) as well, the steering torque Tr cannot be detected. Therefore, the torque computation section 32 performs the processing of step S54.

In the case where the torque computation section 32 makes a "No" determination in step S58, the torque computation section 32 can detect the steering torque Tr. Therefore, the torque computation section 32 ends the present execution of the present routine while skipping the processing of step S54.

In this wire breakage anomaly processing routine, the torque computation section 32 outputs a torque detection impossible signal when breakages of two or more lines of the external first excitation line 210b, the external second excitation line 220b, and the external ground line 240b are detected simultaneously. Furthermore, the torque computation section 32 outputs the torque detection impossible signal when breakage of the electric resistance element 230 and breakage of the external first excitation line 210b or the external second excitation line 220b are detected simultaneously.

The torque detection apparatus of the present embodiment described above employs a configuration in which the first excitation line 210 and the second excitation line 220 for supplying excitation signals to the first excitation coil 111 and the second excitation coil 121 are provided independently of each other; and the first excitation line 210 and the second excitation line 220 are connected together within the resolver unit via the electric resistance element 230. Therefore, even when one of the excitation lines breaks, steering torque can be detected.

Furthermore, since the excitation signals are generated such that the first excitation signal supplied to the first excitation line 210 and the second excitation signal supplied to the second excitation line 220 become opposite each other in phase (signals having voltage waveforms which are reverse to each other), steering torque can be detected even when the ground line 240 is broken. Therefore, the electric power steering apparatus can continue steering assist. Accordingly, the reliability of the electric power steering apparatus is improved.

Figure 14:
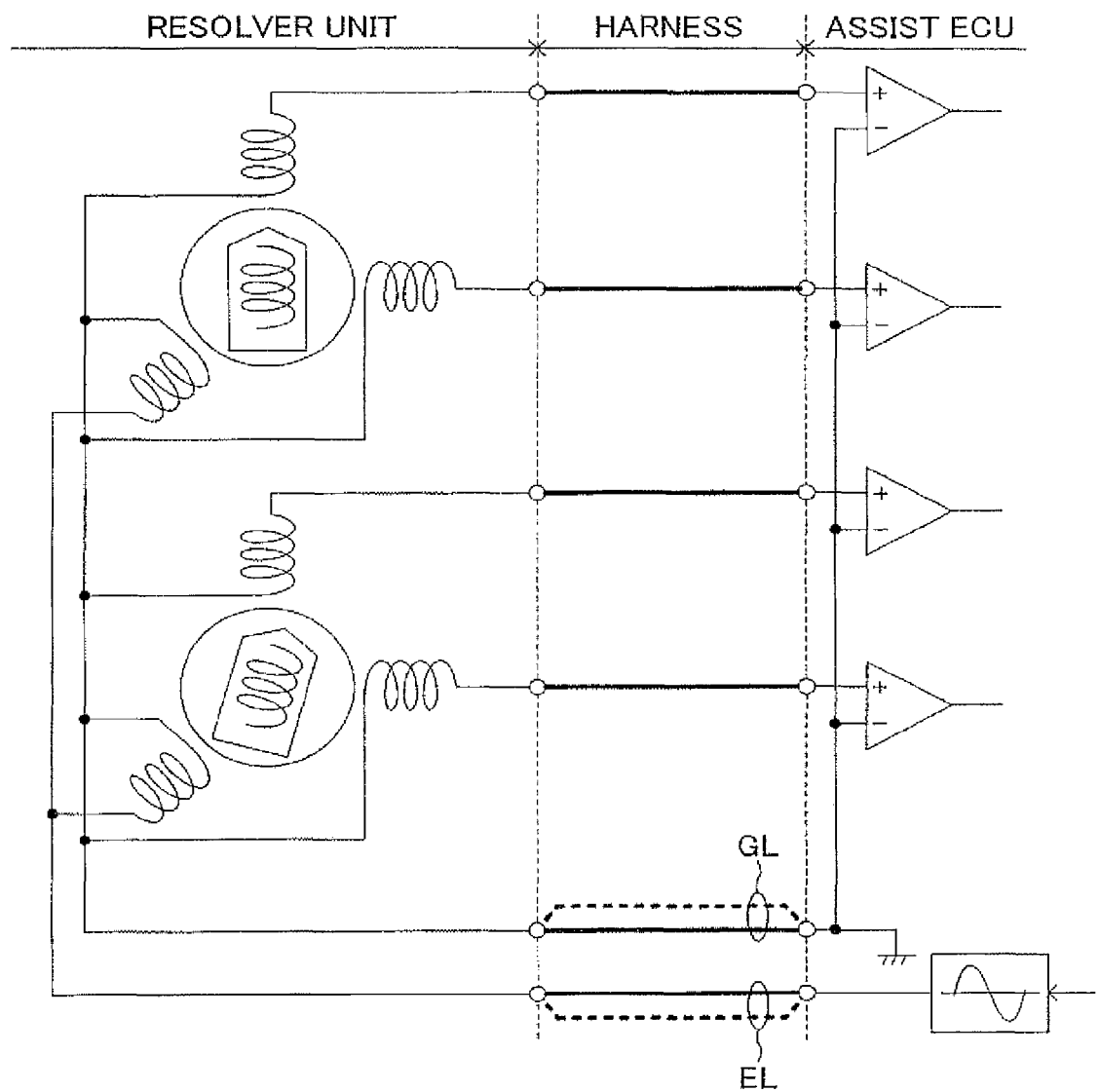
FIG. 14 is an electrical circuit diagram of a conventional torque detection apparatus, showing the structure of a resolver unit, and the connection between the resolver unit and an assist ECU.

FIG. 14 schematically shows the configuration of a conventional torque detection apparatus for comparison with the torque detection apparatus of the present embodiment. As can be understood from the compassion between FIG. 14 and FIG. 2, in the case of the torque detection apparatus of the present embodiment, reliability in terms of wire breakage can be improved through addition of a simple configuration; i.e., increasing the number of wiring lines connecting the resolver unit 100 and the assist ECU 50 by one as compared with the conventional torque detection apparatus, and connecting the first excitation line 210 and the second excitation line 220 together within the resolver unit 100 via the electric resistance element 230. For example, in the conventional torque detection apparatus, the reliability of the excitation line and the ground line in terms of wire breakage can be improved by employing a redundant configuration; i.e., adding an excitation line EL and a ground line GL as indicated by broken lines in FIG. 14. However, in this case, the total number of the excitation lines EL and the ground lines GL becomes four, resulting in a complex configuration. Moreover, when one of the excitation lines EL or the ground lines GL is broken, such wire breakage cannot be detected.

In contrast, in the present embodiment, since the number of the wiring lines of the wire harness increases by one only, the configuration does not become complex. Furthermore, the first excitation coil 111 and the second excitation coil 121 are driven by use of the first excitation signal and the second excitation signal which are opposite each other in phase. Therefore, even when the ground line 240 is broken, steering torque can be detected.

As described above, the torque detection apparatus of the present embodiment can secure high reliability in terms of wire breakage even though an increase in the number of wiring lines of the wire harness is restrained to one. Moreover, since the structure of the resolvers 110, 120 is almost the same as those of conventional resolvers, the torque detection apparatus of the present embodiment can be readily implemented.

Furthermore, the torque detection apparatus determines whether or not any of the first excitation line 210, the second excitation line 220, the electric resistance element 230, and the ground line 240 is broken; and, upon detection of wire breakage, the torque detection apparatus turns on the warning lamp 65, to thereby prompt the drive to repair the failure. Accordingly, it is possible to suppress occurrence of a malfunction in which detection of steering torque becomes impossible due to a double failure; i.e., occurrence of wire breakage at two locations.

Next, a first modification of the present embodiment will be described. In the present embodiment, the first excitation signal and the second excitation signal, which are opposite each other in phase, are output from the assist ECU 50 to the resolver unit 100 so as to drive the first excitation coil 111 and the second excitation coil 121. However, in an ordinary state (when no wire breakage is present), the first excitation signal and the second excitation signal may be in the same phase. In such a case, since no current flows through the electric resistance element 230, which connects the first excitation line 210 and the second excitation line 220 together, the electric resistance element 230 does not generate heat, and energy can be saved.

Figure 11:
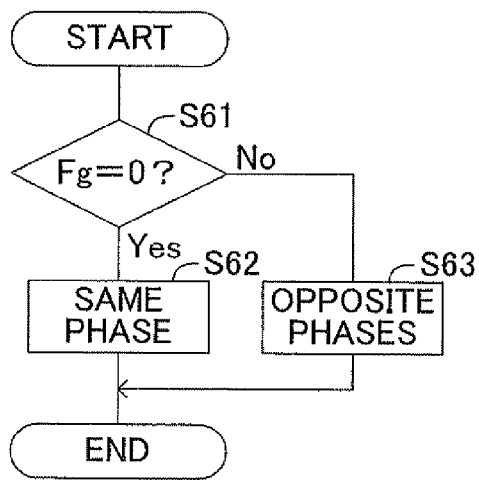
FIG. 11 is a flowchart showing an excitation signal control routine according to a first modification.

In view of the above, in the first modification, the first excitation signal and the second excitation signal are made opposite each other in phase only when breakage of the ground line 240 is detected. FIG. 11 is a flowchart showing an excitation signal control routine executed by the torque computation section 32 according to the first modification. The excitation signal control routine is stored in the ROM of the microcomputer as a control program. The excitation signal control routine is executed at predetermined short intervals, parallel with the above-described steering torque detection routine.

When the excitation signal control routine is started, in step S61, the torque computation section 32 determines whether or not the ground-line-breakage determination flag Fg is set to "0." In the case where the ground-line-breakage determination flag Fg is set to "0," in step S62, the first excitation signal and the second excitation signal are output in the same phase. Meanwhile, in the case where the ground-line-breakage determination flag Fg is set to "1," in step S63, the first excitation signal and the second excitation signal are output in opposite phases. After determination of the phases of the excitation signals, the present execution of the excitation signal control routine is ended. In the case where the first excitation signal and the second excitation signal are output in the same phase, the signs $K_1$, $K_2$ used in the equations for calculating the rotational angles $\theta_1$, $\theta_2$ are made the same.

According to this modification, since the first excitation signal and the second excitation signal are output in the same phase when breakage of the ground line 240 is not detected, no current flows through the electric resistance element 230. As a result, the electric resistance element 230 does not generate heat. Also, energy can be saved. In addition, since the phases of the first excitation signal and the second excitation signal are made opposite each other when breakage of the ground line 240 is detected, the potential of the internal ground line 240a within the resolver unit 100 can be maintained at zero volt. Therefore, the first sin phase detection coil 112, the first cos phase detection coil 113, the second sin phase detection coil 122, and the second cos phase detection coil 123 operate normally, whereby the steering torque Tr can be detected properly.

Notably, in the case where breakage of the first excitation line 210 or breakage of the second excitation line 220 is detected, the first excitation signal and the second excitation signal may be output in the same phase or in opposite phases, because only one of the excitation signals is supplied to the resolver unit 100.

Next, a second modification will be described. In the present embodiment, when the first excitation line 210 or the second excitation line 220 is broken, the first excitation coil 111 or the second excitation coil 121 is driven via the electric resistance element 230. Accordingly, the phase delay $\phi$ of each detection signal in relation to the corresponding excitation signal changes between the ordinary state (in which no wire breakage is present) and a state in which wire breakage is present, whereby the accuracy in calculating the amplitudes drops. In view of this, in the second modification, when breakage of the first excitation line 210 or the second excitation line 220 is detected, the value of the phase delay $\phi$ in the calculation equations is changed to a value determined in consideration of the resistance of the electric resistance element 230.

Figure 12:
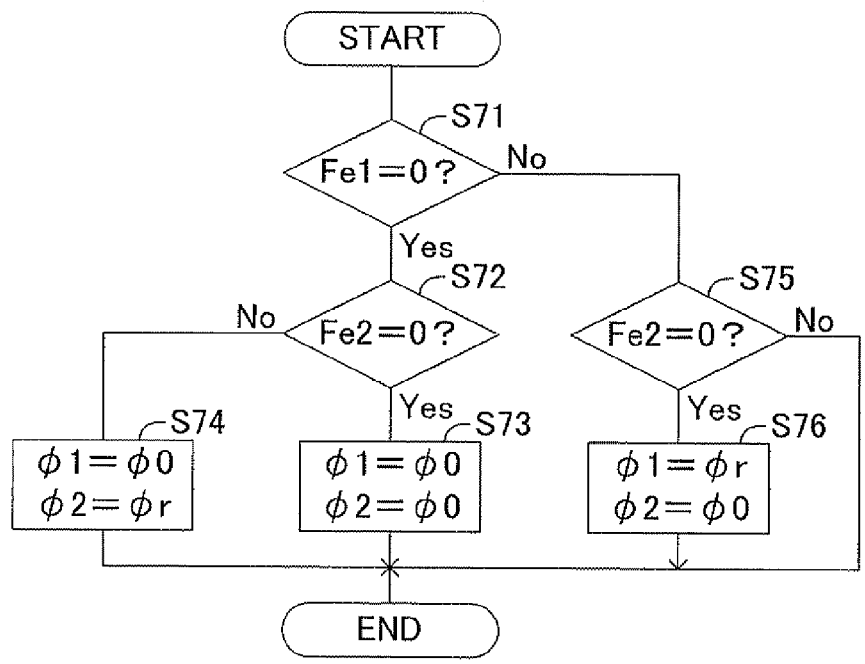
FIG. 12 is a flowchart showing a phase delay switching routine according to a second modification.

FIG. 12 is a flowchart showing a phase delay switching routine executed by the torque computation section 32 according to the second modification. The phase delay switching routine is stored in the ROM of the microcomputer as a control program. The phase delay switching routine is executed at predetermined short intervals, parallel with the above-described steering torque detection routine.

When the phase delay switching routine is started, in step S71, the torque computation section 32 determines whether or not the first-excitation-line-breakage determination flag Fe1 is set to "0." In the case where the first-excitation-line-breakage determination flag Fe1 is set to "0" (S71: Yes), in step S72, the torque computation section 32 determines whether or not the second-excitation-line-breakage determination flag Fe2 is set to "0." In the case where the torque computation section 32 makes a "Yes" determination in step S72; that is, in the case where none of breakage of the first excitation line 210 and breakage of the second excitation line 220 is detected, in step S73, the torque computation section 32 sets the phase delay $\phi$1 of the first resolver 110 to $\phi$0, and sets the phase delay $\phi$2 of the second resolver 120 to $\phi$0. This phase delay $\phi$0 is a previously set value which represents a phase delay produced when the excitation signal is supplied to the excitation coils 111, 121 without the electric resistance element 230 being interposed. The phase delay $\phi$1 is a phase delay 4) used in the calculation of the amplitudes Ss1, Sc1 associated with the first resolver 110, and the phase delay $\phi$2 is a phase delay $\phi$ used in the calculation of the amplitudes Ss2, Sc2 associated with the second resolver 120.

Meanwhile, in the case where the torque computation section 32 makes a "No" determination in step S72; that is, in the case where breakage of the second excitation line 220 only is detected, in step S74, the torque computation section 32 sets the phase delay $\phi$1 of the first resolver 110 to $\phi$0, and sets the phase delay $\phi$2 of the second resolver 120 to $\phi$r. This phase delay $\phi$r is a previously set value which represents a phase delay produced when the excitation signal is supplied to the excitation coil 111 or the excitation coil 121 via the electric resistance element 230. The phase delay φr is set to a value determined in consideration of the resistance R of the electric resistance element 230.

In the case where the torque computation section 32 makes a "No" determination in step S71, in step S75, the torque computation section 32 determines whether or not the second-excitation-line-breakage determination flag Fe2 is set to "0." In the case where the torque computation section 32 makes a "Yes" determination in step S75; that is, in the case where breakage of the first excitation line 210 only is detected, in step S76, the torque computation section 32 sets the phase delay φ1 of the first resolver 110 to φr, and sets the phase delay φ2 of the second resolver 120 to φ0. Furthermore, in the case where the torque computation section 32 makes a "No" determination in step S75, since both the breakage of the first excitation line 210 and the breakage of the second excitation line 220 are detected, detection of the steering torque Tr is impossible. Therefore, the torque computation section 32 does not set the phase delays φ1, φ2.

After having set the phase delays φ1, φ2 in steps S73, S74, S76, the torque computation section 32 ends the current execution of the phase delay switching routine. The torque computation section 32 repeatedly executes the phase delay switching routine at predetermined short intervals.

According to this second modification, since the phase delay is switched between the ordinary state (in which no wire breakage is present) and a state in which wire breakage is present, the amplitudes Ss1, Sc1, Ss2, Sc2 can be calculated properly. As a result, the accuracy in calculating the rotational angles $\theta_1$, $\theta_2$ is improved, and the steering torque Tr can be detected more accurately.

Figure 13:
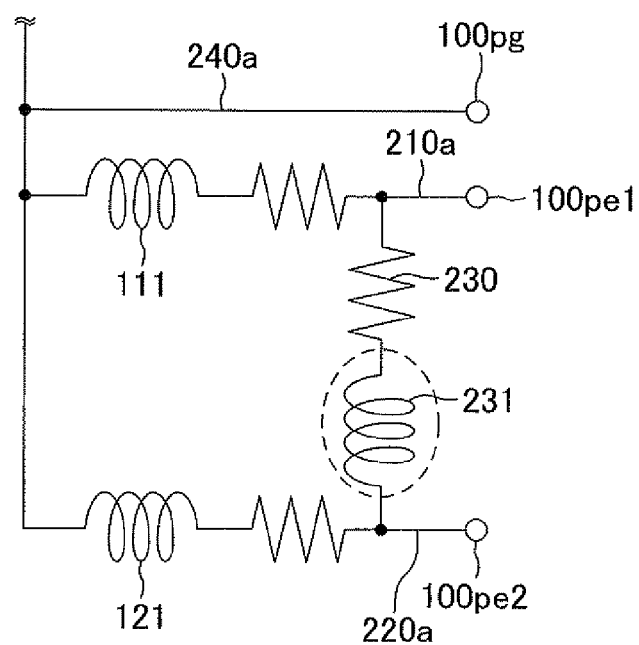
FIG. 13 is an electrical circuit diagram according to a third modification which includes an additional inductor.

Next, a third modification will be described. In the above-described second modification, the torque computation section 32 is configured to switch the phase delay 4) used in the calculation equations when breakage of the first excitation line 210 or the second excitation line 220 is detected. In this third modification, as shown in FIG. 13, an inductor 231 is connected in series to the electric resistance element 230. Thus, a series circuit including the electric resistance element 230 and the inductor 231 is connected between the internal first excitation line 210a and the internal second excitation line 220a. In this case, the inductance of the inductor 231 is set in advance such that the phase delay φ in the ordinary state becomes equal to that in the state in which wire breakage is present.

Accordingly, in this third modification as well, the amplitudes Ss1, Sc1, Ss2, Sc2 can be calculated properly. As a result, the accuracy in calculating the rotational angles $\theta_1$, $\theta_2$ is improved, and the steering torque Tr can be detected accurately. In addition, the computation load of the microcomputer can be reduced as compared with the second modification.

Next, a fourth modification will be described. In the above-descried embodiment, the potential of the ground line 240 is set to zero volt. Thus, the coil drive circuit 52, which generates the first excitation signal and the second excitation signal, requires positive and negative power supplies. In order to overcome this drawback, in the fourth modification, in order to generate each excitation signal by use of a positive power supply only, the potential of the ground line 240; i.e., the potential of the ground port 100pg is fixed to a potential corresponding to about half the power supply voltage.

For example, in the case where the power supply voltage $V_{DD}$=5 V, the potential of the ground line 240 is set to 2.5 V. Here, the ground line 240 will be called the common line 240, and the ground port 100pg and the ground port 50pg are called the common port 100pg and the common port 50pg, respectively. In the following description, the term "common" is used in place of the term "ground."

In the case where the common potential is fixed to a potential corresponding to ½ of the power supply voltage $V_{DD}$, the first excitation voltage $V_1$ and the second excitation voltage $V_2$ are represented by the following equations.

$$V_1 = A_1 \cdot \sin(\omega t) + V_{DD}/2$$

$$V_2 = -A_2 \cdot \sin(\omega t) + V_{DD}/2$$

Accordingly, the coil drive circuit 52 of the assist ECU 50 is configured such that the first excitation signal and the second excitation signal represented by the above-described equations are output from the first excitation signal output port 50pe1 and the second excitation signal output port 50pe2. In this case, the potential of the internal common line 240a can be maintained at $V_{DD}/2$ even when the external common line 240b is broken. Accordingly, the first sin phase detection coil 112, the first cos phase detection coil 113, the second sin phase detection coil 122, and the second cos phase detection coil 123 operate normally. Thus, the steering torque Tr can be obtained, through computation, from the rotational angles $\theta_1$, $\theta_2$ in the same manner as in the ordinary case where no wire breakage is present.

In the above, the present embodiment and its modifications have been described. However, the present invention is not limited to the above-described embodiment and modifications, and can be modified in various ways without departing from the scope of the present invention.

For example, in the present embodiment, the first excitation signal and the second excitation signal are generated such that their phases become opposite each other. However, these excitation signals are not necessarily required to be generated in opposite phases. Further, in the present embodiment, breakage of the ground line 240, the breakage of the excitation lines 210, 220, and breakage of the electric resistance element 230 are individually detected. However, the torque detection apparatus of the present embodiment is not necessarily required to have such a wire breakage detection function.

In the present embodiment, the calculation of the rotational angles $\theta_1$, $\theta_2$ and the calculation of the steering torque Tr are performed by the microcomputer provided in the assist ECU 50. However, the torque detection apparatus may be configured such that the calculation of the rotational angles $\theta_1$, $\theta_2$ is performed in an RD converter (Resolver-Digital-Converter), digital angle data calculated in the RD converter is output to the assist ECU 50, and the steering torque Tr is calculated by the microcomputer of the assist ECU 50. In this case, the RD converter and the resolver unit 100 are connected via a wire harness. Further, the RD converter and the assist ECU constitute the torque computation section of the present invention.

In the present embodiment, the detection of breakage of the excitation lines 210, 220 or the detection of breakage of the ground line 240 is performed on the basis of the sum of squares of amplitudes (($Ss1^2+Sc1^2$) or ($Ss2^2+Sc2^2$)). However, the detection of breakage is not necessarily required to be performed in the above-described manner so long as the detection of breakage is performed on the basis of the detection voltages Es1, Ec1, Es2, Ec2. For example, the first excitation line 210 may be determined to be broken when both the absolute value (|Es1|) of the detection voltage Es1 and the absolute value (|Ec1|) of the detection voltage Ec1 simultaneously become equal to or less than a reference value Ee. The detection of breakage of the second excitation line 220 can be performed in the same manner. The detection of breakage of the ground line 240 may be performed such that, when at least one of the absolute value (|Es1|) of the detection voltage Es1 and the absolute value (|Ec1|) of the detection voltage Ec1 is equal to or greater than a reference value Eg, the ground line 240 is determined to be broken.

The invention claimed is:

1. A torque detection apparatus comprising:
a resolver unit which includes a first resolver having a first excitation coil supplied with an excitation AC signal and adapted to output detection signals corresponding to a first rotational angle of a shaft at a first axial position thereof, and a second resolver having a second excitation coil supplied with an excitation AC signal and adapted to output detection signals corresponding to a second rotational angle of the shaft at a second axial position thereof; and
a torque computation section connected to the resolver unit via a wire harness, the torque computation section supplying the excitation AC signals to the first excitation coil and the second excitation coil, receiving respective detection signals output from the first resolver and the second resolver, calculating the first rotational angle of the shaft at the first axial position and the second rotational angle of the shaft at the second axial position, and calculating a torque acting on the shaft around an axis thereof on the basis of the calculated first and second rotational angles,
the torque detection apparatus being characterized in that the torque computation section supplies the corresponding excitation AC signal to the first excitation coil via a first excitation line, and supplies the corresponding excitation AC signal to the second excitation coil via a second excitation line different from the first excitation line; and
the resolver unit includes an electric resistance element which electrically connects the first excitation line and the second excitation line together.

2. A torque detection apparatus according to claim 1, wherein
the first excitation coil is connected to the torque computation section via the first excitation line connected one end of the first excitation coil and a common ground line connected to the other end of the first excitation coil;
the second excitation coil is connected to the torque computation section via the second excitation line connected to one end of the second excitation coil and the common ground line connected to the other end of the second excitation coil; and
the torque computation section includes a reverse phase coil drive circuit which outputs to the first excitation line and the second excitation line individual excitation AC signals which have the same frequency and which are opposite in phase.

3. A torque detection apparatus according to claim 2, comprising:
first-excitation-line breakage detection means for detecting breakage of the first excitation line on the basis of the detection signals output from the first resolver;
second-excitation-line breakage detection means for detecting breakage of the second excitation line on the basis of the detection signals output from the second resolver; and
rotational angle correction means for inverting the sign of the calculated first rotational angle when breakage of the first excitation line is detected, and inverting the sign of the calculated second rotational angle when breakage of the second excitation line is detected.

4. A torque detection apparatus according to claim 3, further comprising:
phase delay correction means for correcting phase delays of the detection signals output from the first resolver when breakage of the first excitation line is detected, and correcting phase delays of the detection signals output from the second resolver when breakage of the second excitation line is detected.

5. A torque detection apparatus according to claim 3, wherein an inductor is connected in series to the electric resistance element such that, even when the first excitation line or the second excitation line is broken, the phase delays of the detection signals output from the first resolver or the phase delays of the detection signals output from the second resolver do not change.

6. A torque detection apparatus according to claim 3, further comprising excitation line breakage report means for reporting an anomaly when breakage of the first excitation line or breakage of the second excitation line is detected.

7. A torque detection apparatus according to claim 2, further comprising:
ground line breakage detection means for rendering a potential of one of the first excitation line and the second excitation line equal to a set potential of the common ground line, and detecting breakage of the common ground line on the basis of the detection signals of the one of the first resolver and the second resolver in that state; and
ground line breakage report means for reporting an anomaly when breakage of the common ground line is detected.

8. A torque detection apparatus according to claim 1, further comprising:
resistor breakage detection means for causing the torque computation section to open one of the first excitation line and the second excitation line, and detecting breakage of the electric resistance element on the basis of the first rotational angle or the second rotational angle calculated in that state; and
resistor breakage report means for reporting an anomaly when breakage of the electric resistance element is detected.

* * * * *